(12) United States Patent
Tarditi, Jr. et al.

(10) Patent No.: US 7,598,953 B2
(45) Date of Patent: Oct. 6, 2009

(54) INTERPRETER FOR SIMPLIFIED PROGRAMMING OF GRAPHICS PROCESSOR UNITS IN GENERAL PURPOSE PROGRAMMING LANGUAGES

(75) Inventors: David Read Tarditi, Jr., Kirkland, WA (US); Raymond E. Endres, Seattle, WA (US); Vivian Sewelson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 639 days.

(21) Appl. No.: 10/982,027

(22) Filed: Nov. 5, 2004

(65) Prior Publication Data

US 2006/0098017 A1 May 11, 2006

(51) Int. Cl.
*G06T 11/20* (2006.01)
(52) U.S. Cl. ............... 345/440; 345/501; 345/505; 345/522; 719/323; 719/328
(58) Field of Classification Search ............ 345/501, 345/505, 522; 719/323
See application file for complete search history.

(56) References Cited

U.S. PATENT DOCUMENTS

| | | | | |
|---|---|---|---|---|
| 5,604,851 | A * | 2/1997 | Taylor | 345/440 |
| 6,578,197 | B1 | 6/2003 | Peercy et al. | |
| 6,741,255 | B1 * | 5/2004 | Furlani et al. | 345/537 |
| 6,765,571 | B2 * | 7/2004 | Sowizral et al. | 345/420 |
| 7,086,035 | B1 | 8/2006 | Mericas et al. | |
| 2001/0053275 | A1 | 12/2001 | Adachi et al. | |
| 2002/0133784 | A1 | 9/2002 | Gupta et al. | |
| 2003/0218606 | A1 | 11/2003 | Zhirkov et al. | |
| 2004/0012597 | A1 | 1/2004 | Zatz et al. | |
| 2004/0095348 | A1 | 5/2004 | Bleiweiss et al. | |
| 2004/0169671 | A1 | 9/2004 | Aronson et al. | |
| 2004/0237074 | A1 | 11/2004 | Aronson et al. | |
| 2005/0125369 | A1 | 6/2005 | Buck et al. | |
| 2005/0231514 | A1 | 10/2005 | Harper et al. | |

OTHER PUBLICATIONS

McCool et al., "Shader Algebra," Jul 19, 2004, http://www.cgl.uwaterloo.ca/Projects/rendering/Papers/shaderalgebra.pdf, p. 1-9.*

"2004 ACM Workshop on General-Purpose Computing on Graphics Processors," *ACM SIGGRAPH*, Edited by A. Lastra et al., Los Angeles, CA, Aug. 7-8, 2004, 79 pages.

Buck et al., "Brook for GPUs: Stream Computing on Graphics Hardware," *Proceedings of SIGGRAPH*, 2004, 10 pages.

Chatterjee et al., "Scan Primitives for Vector Computers," *Proceedings Supercomputing '90*, Nov. 1990, pp. 666-675.

Engel et al., "Programming Pixel Shaders," and "Optimizing Software Vertex Shaders," *Direct3D ShaderX: Vertex and Pixel Shader Tips and Tricks*, Wordware, 2002, 29 pages.

Fernando et al., "The CG Tutorial—The Definitive Guide to Programmable Real-Time Graphics," Chapter 1, Appendixes B and E, *Addison-Wesley Publishing*, 2003, 55 pages.

Gray, "Microsoft DIRECTX 9 Programmable Graphics Pipeline," Microsoft Press, 2003, 69 pages.

(Continued)

*Primary Examiner*—Antonio A Caschera
(74) *Attorney, Agent, or Firm*—Klarquist Sparkman, LLP.

(57) ABSTRACT

Although GPUs have been harnessed to solve non-graphics problems, these solutions are not widespread because GPUs remain difficult to program. Instead, an interpreter simplifies the task of programming a GPU by providing language constructs such as a set of data types and operations that are more familiar to non-graphics programmers. The interpreter maps these familiar language constructs to the more difficult graphics programming languages such as DirectX®, OpenGL®, Cg®, and/or HLSL®.

23 Claims, 10 Drawing Sheets

OTHER PUBLICATIONS

Guibas et al., "Compilation and Delayed Evaluation in APL,". *Conf. Record of the Fifth Annual ACM Symp. on Princ. of Prog. Lang*, Tucson, Arizona, ACM, Jan. 1978, pp. 1-8.

Microsoft, "DirectX 9.0 SDK Update," msdn.microsoft.com/library, Aug. 2005 (printed from internet on Sep. 1, 2005), 17 pages.

Riffel et al., "Mio: Fast Multipass Partitioning via Priority-Based Instruction Scheduling," *Graphics Hardware 2004*, Aug. 2004. pp. 35-44.

Rost et al., "OpenGL Shading Language," Chapters 1, 7, 8, 17, and Glossary, *Addison-Wesley Publishing*, 2004, 273 pages.

Schreiner, et al., "OpenGL Programming Guide—Fourth Edition," Chapters 1, 7, and 8, *Addison-Wesley Publishing*, 2004, 128 pages.

Whitted, "Graphics Memory for General Applications," *ACM Workshop on General Purpose Computing on Graphics Processor*, Los Angeles, CA, Aug. 7-8, 2004, 37 pages.

Woo, et al., "OpenGL Programming Guide—Third Edition," Chapters 1, 7, 8, and Glossary, *Addison-Wesley Publishing*, 1999, 158 pages.

Ian Buck, Tim Foley, Daniel Horn, Jeremy Sugerman, Kayvon Fatahalian, Mike Houston, and Pat Hanrahan, "Brook for GPUs: Stream Computing on Graphics Hardware," ACM SIGGRAPH, 2004, 10 pages.

Andrew Riffel, Aaron E. Lefohn, Kiril Vidimce, Mark Leone, and John D. Owens. "Mio: Fast Multipass Partitioning via Priority-Based Instruction Scheduling." *Graphics Hardware 2004*, pp. 35-44, Aug. 2004.

Siddhartha Chatterjee, Guy E. Belloch, March Zagha, "Scan Primitives for Vector Computers," Supercomputing, Nov. 1990, 28 pages.

U.S. Appl. No. 10/837,382, filed Apr. 30, 2004, Buck et al.

U.S. Appl. No. 10/445,397, filed May 23, 2003, Aronson et al.

Budd, Timothy A., "An APL Compiler for a Vector Processor," *ACM Transactions on Programming Languages and Systems*, 1984, 17 pages.

McCool et al., "Shader Algebra," ACM Transactions on Graphics, vol. 23, Issue 3, Aug. 2004, pp. 787-795.

McCool, Michael and Du Toit, Stefanus, *Metaprogramming GPUs with Sh*, Canada, A.K. Peters, Ltd., Jul. 29, 2004, 291 pages.

Tarditi et al., "Accelerator: Using Data Parallelism to Program GPUs for General-Purpose Uses," *Association for Computing Machinery, Inc.*, Oct. 21, 2006, 11 pages.

\* cited by examiner

INTERPRETER FOR SIMPLIFIED PROGRAMMING OF GRAPHICS PROCESSOR UNITS IN GENERAL PURPOSE PROGRAMMING LANGUAGES

TECHNICAL FIELD

The technical field relates generally to programming graphics processing units, and more specifically, to providing a component library and or an interpreter for the simplified programming of graphics processors.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A graphics card (e.g., a graphics processor, GPU, etc.) is a special-purpose processor designed for executing computer graphics algorithms on a general purpose computer. Graphics processors often include a specialized programming model that corresponds to the details of a typical computer graphics pipeline. A central processing unit (CPU) uses a graphics processor as a co-processor, much in the way that CPUs have historically used floating point co-processors. The CPU offloads graphics-related computation to a GPU, since the GPU efficiently executes graphics-related computation.

The computational capabilities of many GPUs now significantly exceed the capabilities of CPUs particularly in the area of floating point computation and vector processing. Because the graphics card (e.g., GPU) is often more powerful than the CPU, there has been significant interest in programming the GPUs to solve many (graphics) and non-graphics problems. Although GPUs have been harnessed to solve non-graphics problems, it has been difficult for non-graphics programmers to learn because of the specialized programming model used by GPUs.

There are several obstacles that programmers face. First, they have to learn a specialized programming model used by GPUs. Two common programming interfaces for programming GPUs are DirectX® and OpenGL®. Both are difficult to learn because they are graphics computation oriented. Second, after learning a specialized programming model, a programmer is required to learn a new specialized programming language such as Cg® or HLSL®. Third, there are many subtleties and limitations (e.g., resource limitations) required when programming a GPU that are unknown to procedural or object-oriented programmers. Failure to manage these resources properly will result in a non-working program. For a given graphics programming environment, there may be limitations on the size of programs (e.g., instruction counts), limitations on the available memory, and limitations on the number of input data structures, as well as many other possible limitations. Because of these difficulties, the benefits of a graphics engine have not yet been harnessed by many general purpose programmers.

SUMMARY

The described technologies provide methods and systems for programming a GPU by allowing programmers to utilize more familiar high-level language constructs. The problems noted above are addressed, at least in part, by the systems and methods disclosed herein.

In one example, an interpreter simplifies the task of programming a GPU by providing a set of data types and operations that are more familiar. For example, a data type called a multi-dimensional parallel array is provided. Multi-dimensional parallel arrays appear friendly to programmers because they appear similar to arrays. In one example, a high-level language called C# (pronounced C-sharp) is used to program a graphics processor, although many other languages could be used as well. A set of operations and data types are provided in the selected language directly or via an API. An interpreter is designed to receive these operations and data types as inputs, and to map these operations and data types to one or more low level programming interfaces such as Microsoft Corporation's DirectX® and/or OpenGL® of Silicon Graphics, Inc.

The interpreter allows programmers to use more familiar high-level language constructs, in a high level language such as C#, C++, etc. Some of these high level languages provide garbage collection techniques that further simplify resource management such as memory de-allocation. In one such example, an interpreter provides a set of language constructs such as operations and data types that are easy for programmers to use. The interpreter receives these language constructs as inputs, and programs the GPU transparently to the programmer, according to the resource limitations of the GPU environment. Although not required, such an interpreter can be used with existing high-level environments without modifications to compilers or runtime systems. In one such example, the language constructs and an associated interpreter are provided in a high-level language environment such as C#, and a typical C# programmer can utilize the power of GPU computation without programmer knowledge of an underlying graphics interface or interpreter such as DirectX®, OpenGL®, Cg®, HLSL®, or programmer understanding of the GPU or programs (e.g., shaders) used to provide the resulting parallel processing power.

Additional features and advantages will be made apparent from the following detailed description, which proceeds with reference to the accompanying drawings.

DETAILED DESCRIPTION

Overview

Parallel processing provides significant increases in efficiency for many applications including non-graphics programming. This technology focuses on providing a simplified way for a programmer to define parts of a program that may be more efficiently performed using parallel processing. The described technologies invoke parallel processing on a graphics processing unit, without requiring a programmer to learn a graphics programming language.

Exemplary Method for Programming Graphics Processors

Figure 1:
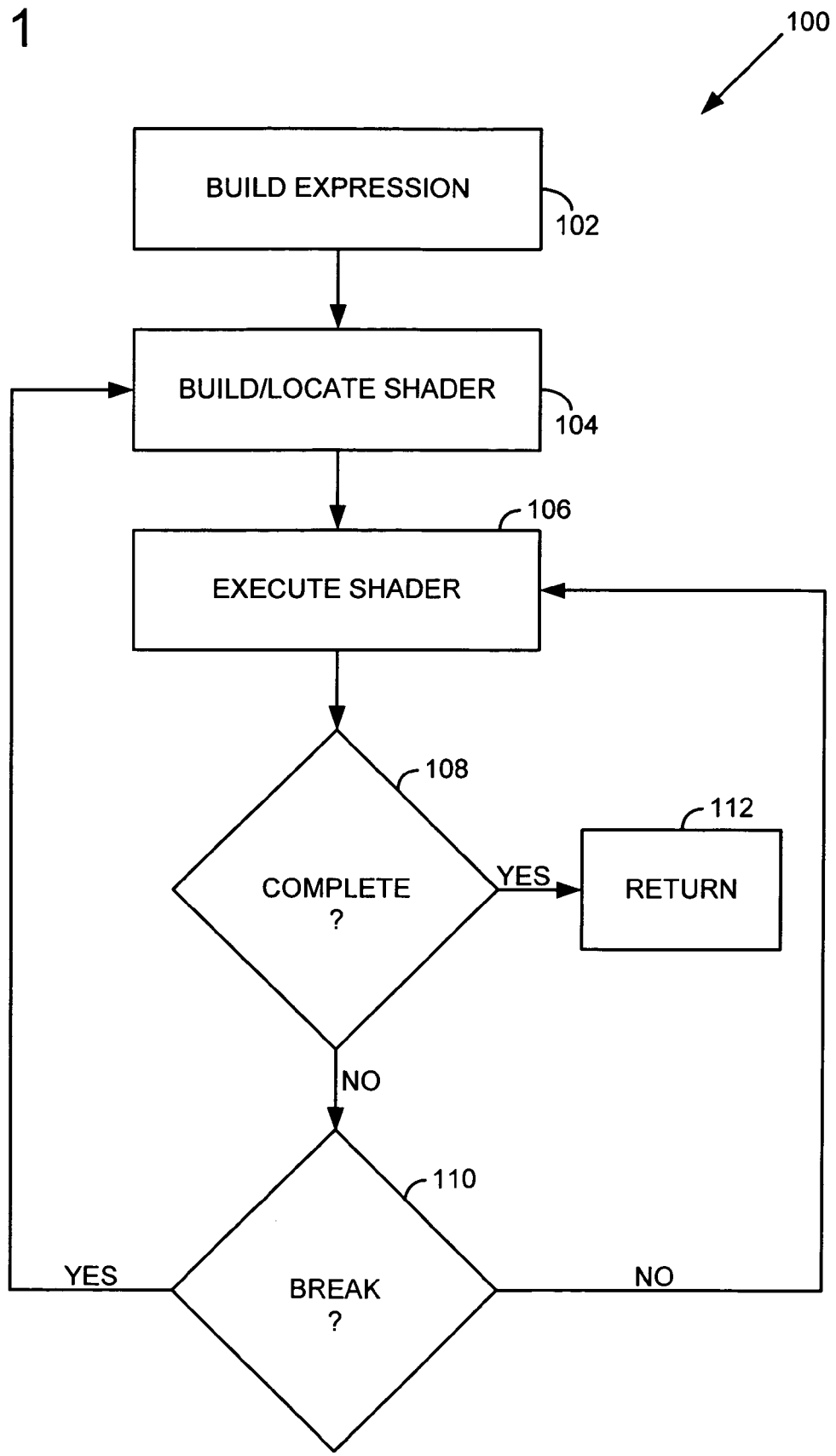
FIG. 1 is a flowchart for an exemplary method for programming graphics processors using general purpose programming language constructs.

FIG. 1 is a flowchart for an exemplary method for simplified programming of graphics processor units using a general purpose programming languages.

As shown, the method 100 receives a series of requests comprising multi-dimensional data parallel arrays (MDPAs) and associated operations and programs the graphical processing unit.

At 102, the method receives an expression of one or more MDPAs and associated operations. The method builds a data structure comprising the expression. In one example, the data structure is a directed acyclic graph (DAG) comprising MDPAs, operations, and possibly other input values such as constants. When an expression result is requested or required for evaluation, the method proceeds to step 104.

At 104, the method traverses the data structure and maps a graphics program to an operation indicated in the data structure. For example, the method identifies a portion of the expression to be evaluated, and then creates or selects a graphics resource for evaluating that portion. In one example, the graphics resources used to evaluate the expression comprise graphics programs (e.g., shaders). The method traverses the data structure, selects an operation identified in the expression, and locates or creates a shader to perform the operation. For example, the method begins a depth first search of a DAG and builds or locates a shader(s) that is able to process requested operations on the expression. If an existing shader is not available for processing a requested operation, the method builds (e.g., compiles) a shader for the operation. A shader may already exist for a requested operation, or a shader may have been recently built for the operation. Once a shader is identified or created, the method continues.

At 106, the method directs the graphics shader to perform the operation on the identified or created graphics program. For example, the method loads a shader into graphics memory along with a portion of the expression identified as corresponding to the identified or created shader. The method then directs the graphics processor to execute the shader in order to evaluate a portion of the expression. Upon completion of directed execution 106 the method continues at step 108.

At 108, the method determines whether the built expression 102 is completely evaluated 108. If evaluation is complete, the method returns the results 112. If evaluation is not complete, the method continues at step 110.

At 110, the method determines whether the graphics shader needs to be changed before evaluation of the expression can continue. For example, the method determines whether graphics resources such as memory have been exceeded, or whether the presently running graphics program (e.g., a shader) needs to be changed (e.g., a shader break) to continue evaluation of the expression. If the graphics program needs to be changed, the method continues at step 104, otherwise the method continues at step 106. If the method continues at 106, the method instructs the graphics processor to continue evaluating the expression using the existing graphics program with possible changes, such as changes to an operator or operand or providing additional memory resources. If the method continues at 104, the method locates or creates a new graphics program to continue evaluating the expression. The method continues evaluating the expression, and returns 112 results of the expression evaluation upon completion.

Exemplary System for Programming Graphics Processors

Figure 2:
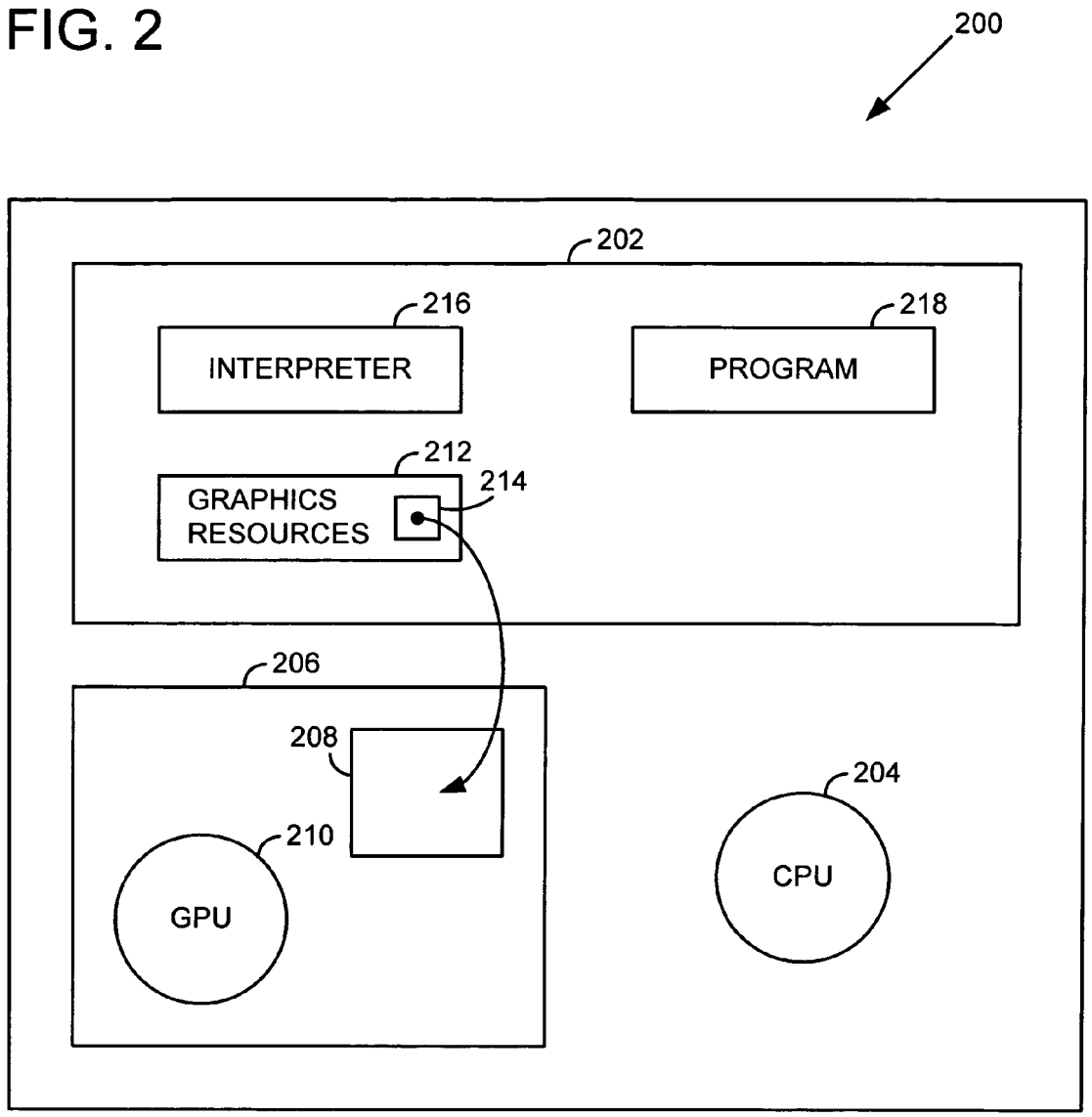
FIG. 2 is a block diagram of an exemplary system for programming a graphics processor.

FIG. 2 is a block diagram of an exemplary system for the simplified programming of graphics processor units using general purpose programming languages.

The computer system 200 includes a central processing unit 204, a computer memory 202, and a graphics card 206. The computer memory includes a program 218, an interpreter 216, and graphics resources 212. The graphics resources comprise graphics programs, such as shader programs 214. The graphics card includes graphics memory 208 and a graphics processing unit 210.

In one example, the program 218 includes a series of requests including a request to perform parallel processing. In one such example, the series of requests include multi-dimensional data parallel arrays (MDPAs) and associated parallel processing operations. In one such example, the programmer knowingly defines data types as MDPAs in order to signal to the interpreter to process the series of requests on a parallel processor (e.g., a graphics card) instead of a CPU. In one specific example, the programmer does not know how to program a graphics processor, or the programmer does not have time to program the graphics processor, so the programmer instead uses MDPAs in the source code because it is understood that an interpreter will translate these abstract data types and associated operations into parallel processing requests on the graphics processor using graphics programs such as shaders.

In another example, the interpreter 216 processes a series of requests received from the program 218, by programming a graphics card 206. In such an example, the interpreter converts the series of requests into the program paradigm of an underlying graphics resources 212 such as DirectX®, OpenGL®, Cg®, or HLSL®, etc. In one such example, the interpreter maps the series of requests into one or more shader programs available via the graphics resource(s). The interpreter then executes the shader programs, obtains the results, and coerces an output texture from a shader program back into a standard language array in the language of the program 218, and returns the standard array to the program 218.

In another example, the series of requests from the program 218 are converted into a directed acyclical graph (e.g., DAG) representing the MDPAs and associated operations. In such an example, the DAG is evaluated by the interpreter 216 by traversing the DAG and performing the associated operations. As operations in the graph are encountered, the interpreter maps the operation to a shader in the graphics resources, and instructs the graphics processor to execute the shader to obtain the desired operation result. In one such example, operations are performed via mapped shaders until a requested result is obtained.

In one example, the interpreter is a just-in-time compiler. In another example, the interpreter is a component in the language of the program 218, or otherwise made available (e.g., library, system resource, etc.) to the program 218.

Exemplary GPU Programming Layers

Figure 3:
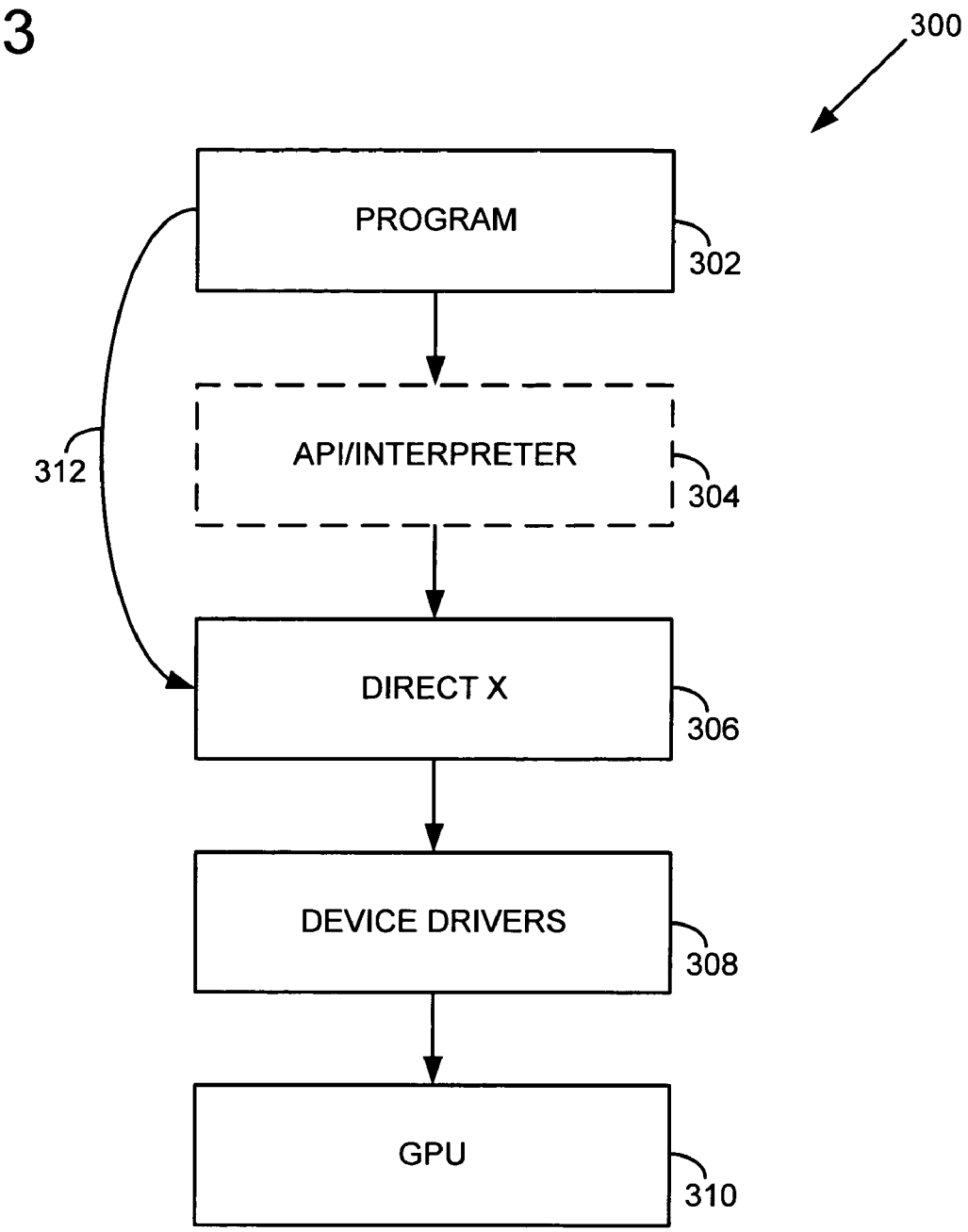
FIG. 3 is a block diagram of an exemplary programming layers for programming a graphics processor.

FIG. 3 is a block diagram of an exemplary method 300 of programming a GPU. In the past, a program 302 accessed 312 a DirectX® or an OpenGL® application programming interface (API) 306 to program the graphical processing unit (GPU). These APIs 306 provided an assembly language for programming GPUs, which is essentially an assembly language for programming vertex shaders and pixel shaders. These APIs allowed a programmer to generate a sequence of instructions, using DirectX® or OpenGL®. After the instructions were generated, the programmer then instructed DirectX® or OpenGL® to execute the instructions. Upon this request, DirectX® or OpenGL® made calls to a device driver that controlled the GPU hardware 310 and that translated these instructions to actual machine instructions for the GPU hardware 310. Since the API 306 is designed to program high performance gaming, it is difficult to use.

Instead, a high-level application programming interface (API) and interpreter is provided 304 to the high-level programming level 302. This API 304 could also be provided as syntactic extensions to a language. For example, the syntactic extensions of (e.g., data types and operators) could be provided as language constructs and compiled via the language compiler of the existing programming language 302. Thus, it is not required to be a separate API or interpreter.

In one example, a new data type called a multi-dimensional data parallel array (MDPA) is introduced along with operations that can be performed on the MDPAs. Thus, the API 304 provides MDPAs and associated operations that are mapped down to the lower level API 306, thereby invoking the device drivers on the GPU. In one such example, the interpreter is performing just-in-time compilation of these MDPAs and operations. The resulting just-in-time compiled code generates generate calls according to the DirectX® or OpenGL® API 306. For example, the device drivers translate 308 the API calls 306 into code that will run on the GPU 310.

For contrast of the described API 304 or language extensions 304 with the prior languages 306 such as OpenGL®, DirectX®, Cg® and HLSL®, these languages were not as abstract. So even though some allowed programming in a higher level language, such as C, the constructs used to program in Cg® and HLSL® were explicitly tied to the OpenGL and DirectX® constructs, respectively. Thus, a Cg® or HLSL® programmer was working with bitmaps or textures, and was programming a shader to work on a bitmap. Whereas, the described API 304 or language constructs 304 are created and manipulated in higher level constructs, such as an MDPA.

Exemplary Programming Interface

In one example, an exemplary system comprises an application programming interface (API) provided to programmers, and an interpreter for manipulating expressions generated according to the API. In one such example, the API provides language constructs for programming comprising a new set of data types and a set of operations that can be performed on the data types. In one such example, the API is provided via a library component that defines the language constructs and interprets service requests made via the new set of data types and operations. In one such example, the service requests are interpreted by an interpreter embedded in the library. For example, one new data type is called a multi-dimensional data parallel array. MDPAs are available in one or more dimensions. Typically, one to four dimensions will be requested by programmers for many practices. A MDPA is analogous to a multi-dimensional array in conventional languages, and the dimensions are analogous to dimensions of arrays. Although not required, in one example, a MDPA can be restricted in the set of operations that can be performed on it. For example, random access or access via pointers can be restricted on MDPAs.

Exemplary Operations on MDPA

A set of operations are provided for operating on MDPAs. For example, operations for defining or creating MDPAs, operations for coercing MDPAs to and from arrays and bit maps, operations for arithmetic manipulation of MDPAs, operations for Boolean evaluations on MDPAs, operations for reductions and scans on MDPAs, operations for altering MDPA dimensions, and algebraic operations on MDPAs. In more detail, these operations comprise:

1. Creation of a MDPA: A MDPA is typically created by coercing a standard language array or bitmap into a MDPA.

2. Transforming a MDPA: A MDPA can be coerced back into a standard language array or bitmap.

3. Arithmetic operations on MDPAs: addition, multiplication, division, subtraction, negation, sine, cosine, maximum, minimum, exponentiation, absolute value, logarithm, floor and ceiling.

4. Boolean operations on MDPAs: and, or, not, great than, less than, and equal.

5. Reductions and scans across a dimension: addition, multiplication, max, min, and, or.

6. Operations that alter the dimensions of the MDPA: expand, drop dimension, tile, transpose, shift, rotate, pad, scatter and gather.

7. Linear algebra operations: inner product, outer product, etc.

The explicit coercions between MDPAs and standard arrays are a desirable part of the described technology. MDPAs can be thought of as data structures that exist mainly in the GPU memory, while standard arrays exist mainly in CPU memory. Thus, arrays are coerced into MDPAs that are manipulated by shaders that run on the GPU.

In one example, and although not required, when operations are performed on MDPAs, the results are produced in new MDPAs. In such an example, operations do not modify the value of an old MDPA. In this example, the interpreter has the freedom to reorder MDPA operations without being constrained by side-effects. For example a MDPA in GPU memory is not changed by an operation, but the results of an operation on that MDPA are provided in a new results MDPA.

Exemplary Interpreter

One of the challenges in implementing the provided language constructs (e.g., 304) is hiding the details of resource management from the programmer and still providing a system that works.

Figure 4:
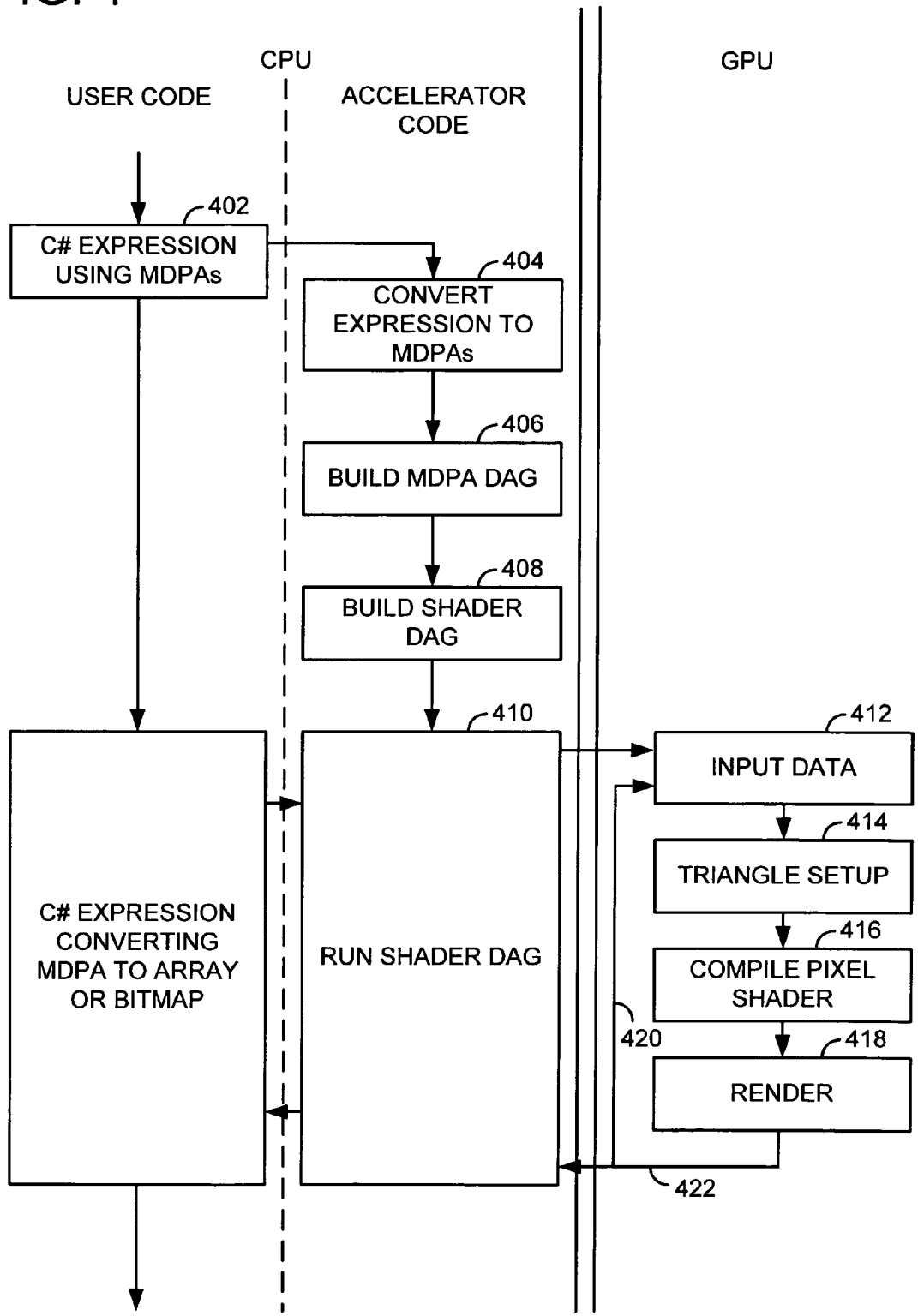
FIG. 4 is a flowchart of an exemplary method of programming a graphics processing unit.

FIG. 4 is a flow chart of an exemplary method of programming a graphics processor. MDPAs are defined in high-level language constructs written by a programmer 402. In one example, an interpreter receives 404 input according to an API and translates 404-410 the input into a series of instructions according to an underlying graphics language such as DirectX® or OpenGL®. In one example, the system invokes garbage collection, which may not otherwise immediately reclaim resources. Prompt reclamation of scarce GPU resources is even more important in a resource intensive and limited GPU environment.

In one example, the high-level operations (e.g., arithmetic, Boolean, etc.) do not immediately do computation on MDPAs. Instead, in one such example, the interpreter builds 406 a directed-acyclic graph (DAG) that represents a computation tree, the nodes of the tree comprising input MDPAs and the operations to be performed on the input MDPAs.

In one such example, computation of the operations on MDPAs is delayed until a request is made to coerce the MDPA back into a standard language array. At this point, the programmer has defined 402 the MDPA(s) and the operations to be performed on the defined MDPA(s), and the programmer has requested the results (not shown). The interpreter creates a DAG of shaders that perform the corresponding operations, and emits a series of GPU operations exposed by the GPU interface (e.g., DirectX® or OpenGL®). In one example, the interpreter rearranges 408 the order of MDPA operations (e.g., reorganizes the DAG) to stay within the resource constraints of the target GPU. In addition, the interpreter may break the MDPA operations into a set of GPU programs 408 (e.g., shaders), so that each program is short enough to be executed on the GPU within the specific resource constraints. In one such example, the interpreter maps the MDPA operations onto a set of pixel shaders 408 according to the required operations. In another example, the interpreter optimizes 408 the mapping of MDPA operations to pixel shaders and GPU textures to increase efficiency.

A texture is a multidimensional section of video memory that the GPU references when it executes a pixel shader program. In the graphics context, a pixel shader calculates the color of each pixel on the output surface in parallel. However, as previously stated, these pixel shader programs provide parallel processing which is useful in many other non-graphics contexts. A pixel shader receives 412 a texture as input. In one respect, the GPU is designed to compute the colors of many pixels in parallel. The parallel processing is one of the benefits harnessed by the described technologies. The computation performed by the GPU is based on the shader selected along with many other factors. This computational power of the GPU is harnessed for general purpose computing by converting an input MDPA to a texture in video memory and generating a pixel shader program or programs designed to compute pixel colors. These colors can be interpreted as the desired output. In order to harness the power of the GPU for general purpose programming, the pixel shader programs have limitations that need to be managed by the interpreter since the programmer is no longer required to manage these resources. In one example, an interpreter manages (410) one or more of the following:

1. Pixel shader inputs are output from a vertex shader. Two pixel shaders can not directly follow each other.
2. A pixel shader is often allowed only a limited number of instructions.
3. Pixel shaders often do not support branching or looping.
4. A GPU is programmed automatically by the interpreter via a special purpose language designed for rendering graphics.
5. Typically, a fixed or limited number of textures can be accessed by a pixel shader.
6. Pixel shaders can use no temporary memory.
7. Pixel shaders can use only a limited number of constants.

In one example, the interpreter receives 404 definitions of MDPAs and operations on the defined MDPAs via the API, but the interpreter delays requesting the GPU to evaluate the operations. Instead, by building up an expression DAG and delaying computation of that DAG until the result is requested by the programmer, the interpreter is able to minimize the number of textures used, and to manage the number of operations per shader. Additionally, by managing the GPU resources, the interpreter hides the overhead of DirectX® and OpenGL® from the programmer. Without this interpreter delay, a complete rendering of the full graphics pipeline would be required for each operation.

Once the result is requested, a DAG of shaders is built.

When this shader DAG is executed, the interpreter initializes 410, 412 input textures, constants, a vertex buffer and vertex shader, to run each pixel shader. The looping and branching as provided by the interpreter 420 overcomes the lack of looping and branching in a pixel shader. Therefore a single operation, such as an inner product, is broken up into many shader nodes.

Theoretically, every node in the expression DAG could be computed as a separate texture. However, if this were done, the interpreter would quickly run out of texture memory. Thus, as an additional optimization, many expression nodes are often combined into one shader node or pixel shader 420. However, for cases when this automatic optimization is not sufficient, the user is allowed to force an evaluation of portions of the entire DAG and the intermediate textures are discarded for better memory management. Some optimizations include chaining arithmetic operations into one shader. Other operations, such as shift and rotate, only change which MDPA element is operated upon. This can be expressed as a texture coordinate change on a shader program that performs the arithmetic operation later and thus need not be computed separately.

The GPU requires input data 412 such as a texture (e.g., MDPAs), constants, etc., for processing a requested shader. The vertex buffer is created to two triangles which cover the input texture in graphics memory 414, and a pixel shader is compiled 416, and the shader renders the requested output 418. For example, pixel shader assembly code is compiled 416 into a shader that can execute a desired operation. An output may require several iterations 420 until the desired DAG evaluation is complete 422. Significant work has been compiled indicating how to utilize graphical programs (e.g., shaders) for performing non-graphical parallel processing (see e.g., Buck et al., "System and Method for Accelerating and Optimizing The Processing of Machine Learning Techniques Using A Graphics Processing Unit", U.S. patent application Ser. No. 10/837,382, filed Apr. 30, 2004, which is incorporated herein by reference).

Exemplary Language Constructs

An exemplary set of semantic language extensions for improving or accelerating graphics programming (e.g., Accelerator language constructs) are provided to a programmer. These language constructs enable a broad set of data parallel applications in the below described abstract context, without requiring the programmer to understand graphics programming (e.g., programming shaders) such as DirectX®, OpenGL®, Cg®, HLSL®, etc. An interpreter (e.g., Accelerator interpreter) receives the Accelerator language constructs and translates them into graphics programming calls. The language semantics are broken into data types, operations, and libraries.

Accelerator Data Types

Parallelism in processing is expressed as operations on multi-dimensional data parallel arrays (MDPAs). A MDPA is an ordered, possibly multi-dimensional, collection of elements of a simple data type, such as float or integer. Accelerator MDPAs are defined as AcMDPA to indicate they are Accelerator data types. These AcMDPAs can be manipulated, combined, or altered using operations described below. In one example, it is desirable if the element values in an MDPA are fixed for the duration of the computation of a requested operation. This allows an Accelerator Interpreter to schedule sub-computations in parallel on any available hardware.

An AcMDPA can be constructed from various data sources such as Arrays or Bitmaps. In standard languages, individual array elements are typically accessible, for example, by requesting an element at a given index location. In one example, individual element access is disabled for AcMDPAs. The Accelerator Interpreter uses the AcMDPAs in calls made to underlying graphics programming APIs, so this functionality is not necessary to the programmer using the Accelerator API. However, as will be discussed later, once the programmer requests results from an associated operation, the interpreter coerces the AcMDPA back into a standard array where a programmer can index individual elements. Thus, the AcMDPA exists for ease of expression and for efficient computation of algorithms that can be better performed with parallel processing.

AcMDPAs have an element data type. For example, many data types can be supported such as the intrinsic types shown in Table A.

TABLE A

| Intrinsic Type | Storage |
|---|---|
| System.Boolean | 1 byte |
| System.Byte | 1 byte |
| System.Double | 8 bytes |
| System.Int32 | 4 bytes |
| System.Int64 | 8 bytes |
| System.Int16 | 2 bytes |
| System.Single | 4 bytes |

Additionally, if desirable, QuadFloats (a record or tuple of 4 single precision floating point numbers), pairs of doubles precision floating point numbers, QuadInts and DoubleLongs can be supported, along with others. The data type of an AcMDPA is determined by the type of the values it contains (intrinsic types) and by its shape (dimensions). Strongly typing AcMDPAs is not required, but in one example, an integer AcMDPA of dimensions 4×6, is not the same type as an integer AcMDPA of shape 8×3.

AcMDPA Construction

In one example, an AcMDPA is created with two inputs specified—the shape of the new MDPA and the initial values of entries in the MDPA. In one example, an interpreter receives the inputs and converts the inputs (e.g., an existing array) to an AcMDPA, where the created AcMDPA takes both its dimensions and initial values from those of the array. In another example, creation from a bitmap is supported. Since a bitmap has two dimensions along with quad or single float values, a bitmap also contains enough information to create an AcMDPA. In one example, once a new AcMDPA is constructed, the association between the new AcMDPA and the input array or bitmap ends.

In one example, an AcMDPA is defined with the following statement:

Void CreateMDPA(T[, . . . ] af, out AcMDPA<T> acsT)

This statement creates a new AcMDPA of type T with the same dimensions and initial data as T, so long as the intrinsic type of T is supported. For example, if af was defined as [1, 3, 7], the output AcMDPA would be of one dimension of three integer intrinsic elements.

In another example, and for ease of use, an AcMDPA is defined as follows:

Void CreateMDPA(Bitmap bmp, out AcFloat4MDPA acs)

This statement creates a new quadfloat AcMDPA whose dimensions and initial data are the same as those of the input bmp, and the following statement, Void CreateMDPA (Texture tex, out AcFloat4MDPA acs), defines a new quadfloat AcMDPA whose dimensions and initial data are the same as those of the input "tex". From these examples, it is apparent how to define various AcMDPAs. The types of AcMDPAs supported by the interpreter should preferably be diverse. Although not required, this allows a programmer to learn the AcMDPA data types and operations once, and allows an Accelerator interpreter to translate the inputs to the underlying graphics programming model regardless of whatever model is in use (e.g., DirectX®, OpenGL®, Cg®, HLSL®, etc.).

A specific Accelerator API and Interpreter could support other ways of creating AcMDPAs. For example, to create an AcMDPA of a particular dimension and with constant element values, the Accelerator interface supports a constructor that does this by taking the constant value and an array of dimensions as follows:

void CreateMDPA (<T> valueConst, int[,,] aiDimensions, out AcMDPA<T>acs)

In one example, AcMDPAs are strongly typed where the type includes not only the underlying data type, but also the rank and dimensions. In one such example, the typing information is determined at compile time. In one example, data ranks are determined at compile time by strong typing (e.g., AcFloatMDPA2D (two dimensional float), AcFloatMDPA3D (three dimensional float), etc.), in another example, rank is determined at run time along with the dimensions. In another example, a specific AcMDPA is defined with the number of elements in the latter dimension fixed, such as AcFloatMDPA[,,4]. This would be helpful in an example where it is known in advance and should be maintained as a constraint that the last rank of an AcMDPA is comprised of a dimension of four float values.

Exporting an AcMDPA

Programmers utilize the Accelerator API (AAPI) to request parallel processing via the AcMDPAs and operations. The Accelerator Interpreter (AI) receives the AAPI requests and maps them to the underlying graphical programming APIs (GAPIs). Once the interpreter maps the calls to one or more shaders via the GAPIs, a result is returned to the AI from via the GAPI outputs. These results are returned to the programmer as outputs of the AAPI requests. These outputs of the AAPI requests live in system memory as opposed to graphics memory, so the outputs need to be offered (e.g., returned as call outputs) to the programmer via the AAPI interface. Thus, not only does the AI create AcMDPAs from conventional data structures, the AI also creates conventional data structures from AcMDPAs and returns them as outputs. For example, an AcMDPA can be exported to an array. The type of the array elements and rank and dimensions will correspond with those of the source AcMDPA. Additionally, when an AcMDPA can be viewed as two dimensional arrays with RGB values, the AcMDPA can be converted to a bitmap output.

In the following example,
void Export(AcMDPA<T> acs, out <T>[,] rgt), a new T array of the same dimensions as acs is created and whose values are set to be those of acs. In the next example,
void Export(AcMDPA acs, out Bitmap bmp), acs is a 2 dimensional quadfloat AcMDPA, and a new bitmap is created with the same dimensions as acs but whose values are the quad float values of acs.

AcMDPA Operations

A number of operations can be provided via the AAPI for requesting parallel processing of AcMDPAs. Any indication of syntax (or language tokens) in this specification whether they are data types, methods or operations, or properties are purely to provide explanations of possible constructs and actions. The purpose is to provide examples of possible functionality for providing Accelerator parallel programming scenarios via the AAPI.

Descriptive Properties

In one example, to be consistent with NET arrays, a rank and a get length operations is define as follows,
Rank( ) returns the number of dimensions in the AcMDPA, and
GetLength(int i) returns the number of elements in the ith dimension.

Additionally, if an example follows the NET convention, all indices will be familiar to a high-level programmer if they are zero based. The ranks of an array can be numbered starting with zero, as well. However, in another example, the indices and rank will vary. In one example, non-zero starting offsets are provided for each dimension.

Arithmetic Operations

There are many operations that can be offered on AcMDPAs. For example, there are many arithmetic operations that can be offered on AcMDPAs of the same shape. For example, an arithmetic operation can be performed between corresponding elements of two AcMDPAs, with the corresponding elements of the AcMDPAs as operands for the arithmetic operation. These operands and the operator can be viewed as instances of an element-wise map. For example, the mapping is defined as,
Map(op,AcMDPA<T> acs1, . . . , AcMDPA<T> acsn, out AcMDPA<T> acsOut)

The arithmetic operation returns in acsOut the AcMDPA made up of the element-wise operation, acs1 <op> acs2 <op> . . . <op> acsn. In one example, the supported arithmetic operations (i.e., <op>) are as shown in the following Table B.

TABLE B

| Unary | |
|---|---|
| Abs | absolute value |
| Rcp | reciprocal |
| Negate | reverse sign |
| Cos | cosine |
| Sin | sin |
| Log | logarithm base 2 |
| Sqrt | square root |
| Binary | |
| Add | addition |
| Sub | subtraction |
| Mul | multiplication |
| Div | division |

TABLE B-continued

| Min | minimum |
|---|---|
| Max | maximum |
| Ternary | |
| Cmp | interleave 2 MDPAs guided by a third (acs1 > 0) ? acs1: acs2 |

It is worth noting that, although there are some cases where element-wise operations between AcMDPAs of different shapes may be desirable, these are typically cases where the smaller AcMDPA is expanded to the size and shape of the larger.

Just as it is desirable to convert from floats to integers in standard numeric computation, it is also desirable to convert between float AcMDPAs and integer AcMDPAs. To handle this, element-wise conversions are provided as follows,
void ConvertTypes(AcMDPA<T> acsIn, out AcMDPA<S> acsOut)

When converting to integers from floats, two methods are provided as follows,
AcIntegerMDPA Floor(AcFloatMDPA acfs), which takes the floor of each element in acfs and
AcIntegerMDPA Ceiling(AcFloatMDPA acfs), which takes the ceiling of each element in acfs. Another method could provide rounding of floats to integer.

In another example, the OuterProduct of two AcMDPAs is the product of all pairs of elements of the two MDPAs, and the method is defined as,
void Outer(op, AcMDPA acs1, AcMDPA acs2), where if acs1 is of shape $(i_0, \ldots, i_{n-1})$ and acs2 is of shape $(j_0 \ldots j_{m-1})$ then the result is of shape $(i_0, \ldots, i_{n-1}, j_0, \ldots, j_{m-1})$. In the resulting MDPA the value in $(i_0, \ldots, i_{n-1}, j_0, \ldots, jm)$ is $acs1(i_0, \ldots, i_{n-1})*acs2(j_0, \ldots, j_{m-1})$.

A similar mapping is defined for InnerProduct, as follows,
void Inner(op1, op2, AcMDPA acs1, AcMDPA acs2)

where, the InnerProduct of two one-dimensional AcMDPAs of the same length is the sum of the pairwise product of the elements of the AcMDPAs. This can be generalized to any two binary operators and conformal AcMDPAs of shape $d_0 x \ldots x d_{n-1}$ and $r_0 x \ldots x r_{m-1}$ where $d_{n-1}=r_0$. The result is an AcMDPA of shape $d_0 x \ldots x d_{n-2} x r_1 x \ldots x r_{m-1}$ where the element in position $i_0, \ldots, i_{n+m-2}$ is, $$\sum_{i=0}^{dn-1} a_{i0,\ldots,in-2,i} * b_{i,in,\ldots,in+m-2}$$

and if op1 is addition and op2 is multiplication. In the case of 2 dimensional AcMDPAs, this is matrix multiplication.

Logical Operations

Various logical operations can be provided for AcMDPAs using the AAPI. In one such example, these logical operations are maps that compare two MDPAs, element-by-element and return true false values, as follows,
void Map(logicalop, AcMDPA<T> acs1, AcMDPA<T> acs2, out AcBoolMDPA csOut) For example, logical operators such as greater than, less than, greater than or equal, less than or equal, equal, and not equal can be supported (e.g., GT, LT, GE, LE, EQ, NE).

Scalar Reduction

In an exemplary scalar operation, the values in an AcMDPA are combined to form a single scalar value. The supported set of reduction operators are preferably supported as commutative operators, void Reduce(op, AcMDPA<T> acs1, out <T> tReduction)

where op comprises such operators as +, *, Max, and Min. These reductions return the sum of all elements, the product of all elements, the largest and the smallest element, respectively. In one example, scalar reductions of the subsets of an AcMDPA can be accomplished by combining the below discussed selection functionality, with these scalar reductions.

Partial Reduction

It is desirable to provide reductions across a single dimension. For example, the row-sum or column-sum of an AcMDPA is a partial reduction. Given an AcMDPA of n dimensions, the result of a partial reduction is an AcMDPA with fewer dimensions, for example, one fewer dimension. In one example, if an input (i.e., acsIn) is an AcMDPA of shape $d_0 \times \ldots \times d_{n-1}$ and an addition reduction is requested along the $k^{th}$ dimension, then, the call would be defined as, void Reduce(op, int iDimension, AcMDPA<Y> acsIn, out AcMDPA<T> acsOut)

and the call returns an AcMDPA of shape $d_0 \times \ldots \times d_{k-2} \times d_k \times \ldots \times d_{n-1}$, where $$acsOut[i_0, \ldots, i_{k-2}, i_k, \ldots, i_{n-1}] = \sum_{j=0}^{d_k - 1} acsIn[i_0, \ldots, i_{k-2}, j, i_k, \ldots, i_{n-1}],$$

for the case when op is addition. In one such example, an interpreter supports the same operations as those defined for reductions (i.e., +, *, Max, and Min).

Selection Operator

A selection operator is used to assemble a new AcMDPA from specified parts of another AcMDPA. In general, the new AcMDPA will be, in some sense, smaller than the original.

To select a portion of an existing AcMDPA, a programmer specifies a start index, a count, and a stride. For example given a one dimensional source AcMDPA, defined as A=(2, 4, 6, 8, 10, 12, 14, 16, 18, 20, 22), a new AcMDPA of three elements (count) can be created by selection. For example, by selecting the first element (start index), and taking every second element thereafter (stride), until three elements are selected (count), the new AcMDPA is created. This examples produces an AcMDPA comprising (2, 6, 10). In one example, the selection is defined using an array. For example, a selection is defined by the array (0, 3, 2), to indicate the following corresponding inputs (start index, element count, stride distance). Thus, this could also be written as (2, 6, 10)=Selection (A, (0, 3, 2)). In another example, a reverse order is provided by using a negative stride from the start index. In the general case, a selection operation defines a (start, count, stride) array for each dimension in the original AcMDPA. The following provides an exemplary selection call, void Selection (AcMDPA <Y> acs, int[ ] rgiSection, out AcMDPA<T> acsOut)

where rgiSelection has length acs.Rank*3. For example if A is the following two dimensional array, 2  4  6  8  10

1  3  5  7  9, then a subsection selection request defined as (1, 1, 0, 0, 3, 2) would create a new sub-AcMDPA of (1, 5, 9). This new sub-AcMDPA is created by taking the three elements, starting with the first and taking every other one (0, 3, 2) from the second row (1, 1, 0) of A. Although this exemplary notation is certainly not required, it allows the creation of a rich set of sub-AcMDPAs. In another example, a potentially more syntactically friendly language could include methods for selecting corners, single planes, or other sub-AcMDPAs requests. For example, in order to drop a dimension, the following call is defined, void DropDimension(AcMDPA<T> acs, bool[ ] rgfToDrop, out AcMDPA<T>acsOut)

In this drop dimension example call, if acs has rank n, rgfToDrop has n elements. The resulting AcMDPA has dimension n-k where k is the number of true values in rgfToDrop. The meaning of a true value in the ith position of rgfToDrop is to drop the ith dimension, provided that dimension has size 1. If that dimension does not have size 1, nothing is dropped.

Conversely, a dimension is added with the following call, void AddDimension(AcMDPA<T> acs, int iNewDimension, out AcMDPA<T>acsOut).

In this add dimension call, if acs has Rank n, then the resulting AcMDPA has rank n+1. In the resulting AcMDPA, the iNewDimension$_{th}$ dimension has size 1.

Replication Operators

A replication operator promotes a smaller AcMDPA to a larger one. These can be helpful in creating operands for some of the arithmetic operations described above. These all are based on the idea of tiling. Given a small MDPA, a method is provided for replicating the AcMDPA to create a new possibly larger AcMDPA of the given dimensions. In one example, a replication operation is defined as,

| void Replicate(AcMDPA<T> ascIn, | // the input array |
|---|---|
|     int[] rgiDimensionsOut, | // the $j^{th}$ entry in rgiDimen- |
| | // sions is the size of the $j^{th}$ |
| | // dimension in the output |
| | // array |
|     out AcMDPA<T> acsOut) | //the return MDPA |

The output AcMDPA, ascOut is a truncation/replication of acsIn where ascOut[$i_0, \ldots, i_{n-1}$]=acsIn[$j_0, \ldots, j_{n-1}$] where $j_k$ is defined as follows:

$j_k = i_k$ (mod ascIn.GetLength(m)) where m=k mod (Rank (acsIn)).

For example, given an initial AcMDPA, acsIn, as input, 2  4  6

1  3  5, and a desire to create a 3×2 array as follows, 2 4
    1 3
    2 4, the request is specified as Replicate(acsIn, (3, 2), out acsOut). This is different from Selection in that Selection is designed to create a smaller AcMDPA and it does so by choosing a regular subset of values along each dimension. Replication supports the idea of repeating a given AcMDPA along various dimensions.

Additionally, an expand operator (not shown) receives an AcMDPA as input, and makes it larger by adding dimensions to it. For example, a two dimensional AcMDPA can have a third dimension added, by adding one (or many) planes to it. This could be provided by adding an existing plane from the same or another AcMDPA, or adding constants or other stated values in the plane. This is helpful for many purposes, such as for preparing non-conforming AcMDPAs for performing other binary operations.

Permutation Operations

In addition to reshaping AcMDPAs by selection and replication, operations are provided for permuting the dimensions. In one example, a multi-dimensional analogy of a transpose of a 2-dimensional matrix is provided. In one example, a permutation operation is specified by an integer AcMDPA that lists the new order of dimensions. In one such example, a dimension order of (2, 0, 1) applied to a 3 dimensional input AcMDPA specifies that the value at the location $(i_0, i_1, i_2)$ in the original AcMDPA, ends up in the $(i_2, i_0, i_1)^{th}$ location in the new AcMDPA. A simple 2-dimensional transpose is specified by the AcMDPA order (1, 0). In one example, a call is defined as, void PermuteDimensions(AcMDPA<T> acsSource, int[ ] rgiDimensions, out AcMDPA<T> acsOut), where acsSource is an n-dimensional AcMDPA of any type, and acsDimensions is an integer array of length acsSource.Rank whose values are the integers from 0 to n−1, in any order, $(i_0, \ldots, i_{n-1})$. The resulting AcMDPA is an n-dimensional AcMDPA where the value acsSource$(j_0, \ldots, j_{n-1})$ is at location $j_0, \ldots, j_{in-1}$.

Scatter/Gather Operations

Selection provides a way to retrieve data from contiguous or uniform-stride locations in an AcMDPA. However, it may be helpful to retrieve data from non-contiguous locations, so an operation called gather is provided.

For one example, the gathered elements are assembled into a one dimensional AcMDPA. To gather "n" distinct elements from a d-dimensional AcMDPA, called acsSource, the following method is demonstrated, void Gather(AcMDPA<T> acsSource, int[,] rgiIndex, out AcMDPA<T>acsOut), where rgiIndex is a 2-dimensional AcMDPA of shape n×d. In this example, the $i^{th}$ row of acsIndex contains the indices in acsSource of the $i^{th}$ element in the output AcMDPA.

For example, if acsSource is a 1-dimensional AcMDPA, comprising the following elements, 5 6 3 4 2 1, and rgiIndex is defined as, 5
    3
    1, then the resulting Gather produces an AcMDPA comprising, 1 4 6.

In this example, the $6^{th}$ element of acsSource is 1, the $4^{th}$ element is 3, and the second element is 6.

In the general case, an output AcMDPA can be of multiple dimensions. Here the indices, in addition to specifying which elements to select, also determine where the element is placed in the output AcMDPA. (Note that this is true in the one dimensional case, as well.) In another example, a gather operation receives an AcMDPA containing the source data and an array that indicates the indices of data (e.g., an index array or "conformal" array) requested from the source. The shape of the index array also determines the shape of the output AcMDPA. For example, suppose the source AcMDPA, acsSource, has 3 dimensions of size 5, 6 and 7. Suppose data is desired from acsSource at positions (2, 4, 6), (2, 5, 6), (1, 3, 5) and (3, 2, 1) to be gathered into a 2 dimensional AcMDPA. In one example, the indices are specified by the following integer AcMDPA of dimensions 3×2×2, 2 2
    1 3

4 5
    3 2

6 6
    5 1

The result of this Gather is the 2×2 AcMDPA whose elements are laid out as follows, (2, 4, 6)  (2, 5, 6)

(1, 3, 5)  (3, 2, 1)

Another exemplary gather request is defined as, void Gather(AcMDPA<T> acsSource, System.Array rgiIndex, out AcMDPA<T> acsOut), where acsSource has shape $(d_0, \ldots, d_{n-1})$, and acsIndex is a k+1 dimensional integer AcMDPA of shape $(e_0, \ldots, e_{k-1}, n)$. The output is a k dimensional AcMDPA where the $(i_0, \ldots, i_{k-1})$ element is acsSource[acsIndex$(i_0, \ldots, i_{k-1}, 0)$, acsIndex$(i_0, \ldots, i_{k-1}, n-1)$].

Scatter does the opposite of a Gather. Scatter takes an AcMDPA of values and writes them into noncontiguous locations in a second AcMDPA. For each element in the source AcMDPA, the indices indicate the destination in the results AcMDPA. For example, when acsSource is one-dimensional, the elements are distributed from the source AcMDPA into a n-dimensional AcMDPA, acsDestination. The call specifies the indices in acsDestination for each element in the source, as follows, void Scatter(AcMDPA<T> acsSource, int[,] rgiIndices, out AcMDPA<T>acsDestination), where rgiIndices is 2-dimensional, and where the i$^{th}$ 'row' of rgiIndices is the coordinates in acsDestination for the i$^{th}$ element in acsSource.

For example, if acsSource is one dimensional, 3 5 6 4 2 and acsIndices is 5×1

0 1 7 4 5 then acsDestination looks like 3 5 * * 4 2 * 6 * ...

where * indicates that the value is unchanged by the Scatter.

In the general case, of an n-dimensional source AcMDPA, the operation provides analogous behavior. For example, the index array has one more dimension than the source. Given, the following 2×3 source AcMDPA, 3  4  5

6  7  8 in order to scatter the 6 elements (sparsely) into a 4×5 destination AcMDPA, as follows, 4  7  *  *  *

5  *  *  *  *

6  *  8  *  *

3  *  *  *  *

*  *  *  *  *, an index AcMDPA is specified as follows, 3  0  1   0  0  0

2  0  2   0  1  2

For example, 5 in the source AcMDPA (from the 0$^{th}$ row and 2$^{nd}$ column) goes to the 1$^{st}$ row and 0$^{th}$ column of the resulting AcMDPA. Thus the index AcMDPA has a (0, 0, 2) value of 1 for the second row of the result and a (1, 0, 2) of 2 for the 0$^{th}$ column of the result.

The following is an exemplary method call for scatter, void Scatter(AcMDPA<T> acsSource, System.Array rgiIndices, out AcMDPA<T> acsDestination)

Let acsSource be of shape $(s_0, \ldots, s_{n-1})$ and acsDestination have shape $(d_0, \ldots, d_{k-1})$, then rgiIndices is an integer array of dimensions $(s_0, \ldots, s_{n-1}, k)$. Thus, the element in acsSource$(i_0, \ldots, i_{n-1})$ is copied into acsDestination(rgiIndices$[i_0, \ldots, i_{n-1}, 0], \ldots,$ rgiIndices$[i_0, \ldots, i_{n-1}, k-1]$). Finally, when there are collisions in the destination on the scatter, the results can be defined or remain indeterminate. For example, the winning value can be predetermined by an ordering imposed on the input AcMDPA, the output AcMDPA, etc.

Shifting Operations

It is desirable to allow a programmer to request element shift operations in parallel programming. Operations for uniformly moving the elements in an AcMDPA, are provided, for example, so they can be used as argument in an operation. For example, in a 1-dimensional AcMDPA, to compute the sum of an element and its right an left neighbors, a left-shifted copy and a right-shifted copy are provided. For example, three basic operations of this kind are shift, rotate and pad.

Repetition is sometimes helpful to the reader. As with all operators discussed herein, variations of these operations can be imagined and offered by those of ordinary skill in the art once these general topics are covered, and these variations are considered within the scope of this discussion. Further, and as stated before, if desirable, the source AcMDPAs remain unchanged, and output AcMDPAs contain results.

For example, when shifting, the source AcMDPA may remain unchanged, and the results are provided in an output AcMDPA. A shift offset is specified, and the empty elements caused by the shift or otherwise remaining in an output AcMDPA get may receive specified values. For example, a few shift methods are specified as follows, void Shift(AcMDPA<T> acs, int[ ] aiShift, float flDefaultVal, out AcMDPA<T>acsOut)

void Shift(AcMDPA<T> acs, int[ ] aiShift, int iDefault, out AcMDPA<T>acsOut)

In one such example, acs is an input AcMDPA, aiShift is an array of shift values—the i$^{th}$ member specifies how many places to move the i$^{th}$ dimension. A positive shift value element is a shift to the right, and negative shift is a shift to the left. In this example, the output AcMDPA is the same shape as acs.

More precisely, if acs is k-dimensional and has shape $n_0 \times \ldots \times n_{k-1}$ and acsOut is the output AcMDPA, then for each $0 \le i < k$, acsOut[ ..., x−aiShift(i), ... ] is acs[ ..., x, ... ].

If x−aiShift(i)$\ge n_i$ or if 0>x−aiShift(i), then acsOut[ ..., x−aiShift(i) % $n_i$, ... ]=flDefault.

In the preceding sentence we specified that when a shifted index, x−aiShift(i) % $n_i$, falls out of range in the resulting AcMDPA, the value used is a specified constant. However, in image processing it may be desirable to use a boundary value. If a boundary values is used instead of a specified default— the value in the 0$^{th}$ position of acs is used if aiShift(i) is positive and the value in the n$^{th}$ position is used if aiShift(i) is negative. This is known as "clamping". In one example, shifting with clamping is performed by the following method call, void Shift(AcMDPA<T> acs, int[ ] aiShift, out AcMDPA<T> acsOut).

Rotate Operations

Rotate is very similar to a Shift operation, except that values in the source AcMDPA are shifted into the empty spots in the new AcMDPA. An exemplary signature for providing a rotate operation is defined as follows, void Rotate(AcMDPA<T> acs, int [ ] aiShift, out AcMDPA<T> acsOut).

In this example, if the source acs is k-dimensional and has shape $n_0 \times \ldots \times n_{k-1}$, acsOut is the output, and for each $0 \le i < k$, acsOut[ ..., x−aiShift(i) % $n_i$, ... ] is acs[ ..., x, ... ].

Pad Operations

In general, referencing an element outside of an AcMDPA may result in a fault. However for ease of notation, it is often desirable to have indices refer to elements outside of the an AcMDPA with the assumption that those out-of-bounds elements will be of a specified fixed value or that the out-of-bounds dimension will wrap. A programmer can set up this behavior with an exemplary Pad operator, void Pad(AcMDPA<T> acsIn, int[ ] aiBefore, int[ ] aiAfter, float fl, AcMDPA<T> acsOut)

For example, if acsIn has n dimensions, aiBefore and aiAfter each have n elements. In this example, aiBefore(j) is the number of additional elements to add before the $j^{th}$ element, aiAfter(j) is the number to add after. Further, fl is the value assigned to these "new" elements. If acsIn has shape $(i_0, \ldots, i_{n-1})$ then the result of Pad has shape $(i_0+\text{aiBefore}(0)+\text{aiAfter}(0), \ldots)$.

To allow a pad with wrapping, an exemplary operator is provided, void Expand(AcMDPA<T> acsIn, int[ ] aiBefore, int[ ] aiAfter, AcMDPA<T> acsOut)

In this example, any AcMDPA access to what was out-of-bounds in acsIn, is taken to be the value of the index modulo the length of the dimension. The resulting AcMDPA has the same rank as acsIn, however each dimension has size ascIn.GetLength(i)+aiBefore[i]+aiAfter[i].

Other Operations

Various other operations are other operations may be desirable for various programming scenarios such as Concatenation, Ravel, APL-Replication, Reverse, and Random Number Generation. For example, concatenation is the appending of one AcMDPA to the end of the other across the last dimension. Ravel provides the elements of an AcMDPA in a canonical order, such as ascending, descending, etc. APL-Replication allows the user to specify the number of copies of subsections of the AcMDPA to repeat in an output AcMDPA. Revere provides a reordering of the elements in an AcMDPA. Random Number Generation generates AcMDPAs of random numbers, for example, by generating an array of random numbers and converting it to a AcMDPA.

Libraries

Some operations are better suited for libraries (e.g., DLL) while others are better supported directly within an interpreter or compiler. These are merely performance considerations but value is added by performance. In this considerations, basic operations have several criteria that may distinguish them from library functions.

1. They more are likely to be supported directly by hardware.
2. They are core operations upon which other operations may be built.
3. They are commonly used and important for a wide class of applications.

On the other hand, libraries may contain simulated (or potentially simulated) operations, complex operations which are common to many applications.

Based on these possible criteria, AcMDPAs of complex numbers and AcMDPAs of quaternions seem to be good candidates for libraries. In this category are also standard operations on matrices and numerical methods.

Signal Compiler/Interpreter

Parallelism is indicated to the compiler or interpreter by a programmer using an AcMDPA data type instead of a standard array. Of course, this request could also be implicit based on the nature of the operation or repetitive nature of the request. Additionally, other language constructs may explicitly or impliedly signal the compiler to generate parallel code. In one example, iterative looping constructs are exposed in the AAPI interface designed specifically for AcMDPAs, and/or standard array types. In one such example, the constructs free the programmer from having to find indices or from having to express iterative operations. This allows the interpreter to provide efficient parallel processing solutions to other problems.

Exemplary .NET Extensions

In one example, AcMDPAs are provided as an extension to the NET array class. Although there is certain naturalness to extending the familiar array class, it might add confusion. Thus, in another example, the AcMDPAs are supported separately from the .NET array class. For example, the functionality could be provided as a separate programming language, in a dynamically linkable library, etc.

Exemplary Efficient MDPA Coercions

One of the additional benefits of providing abstract high-level programming language constructs (e.g., AcMDPA) is that an interpreter (e.g., Accelerator Interpreter) manages resources and organizes calls to underlying graphics resources (e.g., DirectX®, OpenGL®, Cg®, HLSL®, etc.). This allows interpreter designers to create and manage directed acyclic graphs (e.g., DAGs) that represent resource requests waiting to be run on the underlying graphics processing unit.

Figure 5:
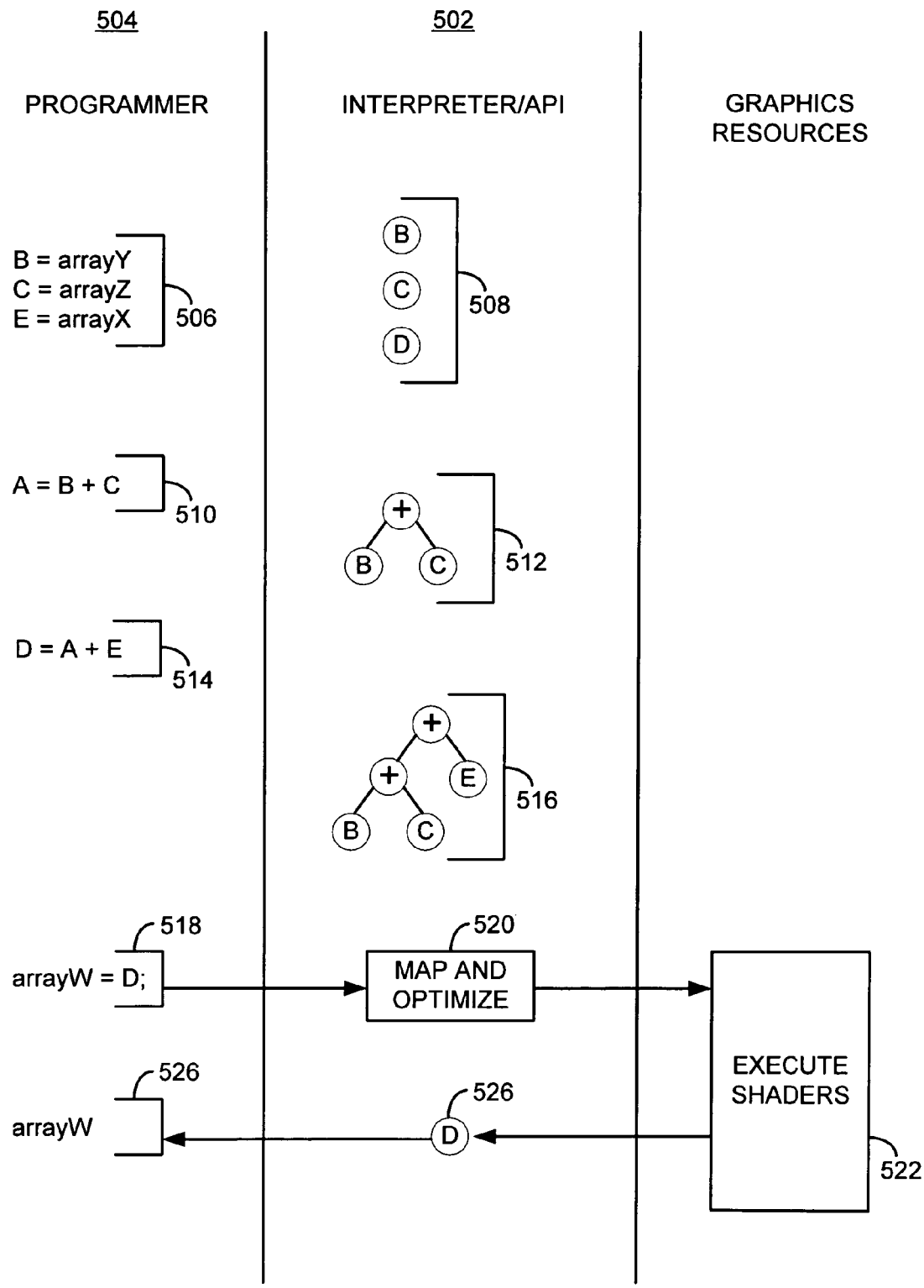
FIG. 5 is a diagram illustrating an exemplary interpreter for managing graphics processing for general purpose parallel processing requests.

FIG. 5 is a diagram illustrating how an exemplary Interpreter and/or API efficiently manages graphics processors for general purpose parallel processing requests. As shown, a high-level programmer 504 defines several MDPAs (i.e., B, C, and E) by assigning standard arrays (i.e., arrayY, arrayZ, and arrayX) to MDPA identifiers 506. The interpreter maintains references to these assignments 508.

Next, the source code requests an operation to be performed 510 on two MDPAs. The interpreter determines that no evaluation is required since there is no use yet required for output of the operation. Thus, the interpreter 502 builds a tree representing the defined relationship 512, and waits. Again, the source code requests another operation 514, and the interpreter again delays computation, but builds the relationship 516 since no use is yet required.

The interpreter builds a relationship 516 of MDPAs and the associated operations requested in the source code. These relationships can be stored in memory as directed acyclic graphs (e.g., DAGs).

In one example, the interpreter builds an expression but delays copying the data representing MPDAs to graphics memory. Thus, in one example, the interpreter returns a reference to a programmer representing an expression that has not yet been copied to graphics memory. The interpreter provides the MDPA datatypes and operations as parallel processing abstract data types, and the programmer expects that these abstract data types are being processed by the graphics processor. Thus, copying of these MDPAs to graphics memory can be delayed until a result is required in the form of a standard language array. Of course, before the result is required, the interpreter is free to create a shader DAG and or optimize that shader DAG.

Once the source code requests a result that requires some use of the result 518, the interpreter builds a DAG of shaders 520 for the requested operations, optimizes this DAG of shaders, loads the shaders in graphics memory, and directs the GPU to execute 522 the mapped shaders in order to provide parallel processing. The interpreter then retrieves the shader processing results from graphics memory 526, and coerces the parallel processing results back into a standard language array 526.

Thus, the interpreter binds MDPAs to expression DAGs, and when a coercion is requested back into a standard array, the interpreter is required to produce and deliver the parallel processing result 526. This gives the interpreter designer the freedom to manage the order of how an expression DAG is evaluated and/or optimized 520. For example, an interpreter would evaluate an expression DAG by building a shader DAG with the fewest number of shaders (nodes). This efficiency analysis would include resource constraints of the shaders along with GPU and graphics memory constraints.

This "delayed coercion" of data from standard arrays to graphics textures and back to standard arrays provides an interpreter designer the opportunity to manage graphics processing efficiently. The building of a shader DAG allows optimizations specific to the shader language used.

Exemplary Graph of MDPA

Figure 6:
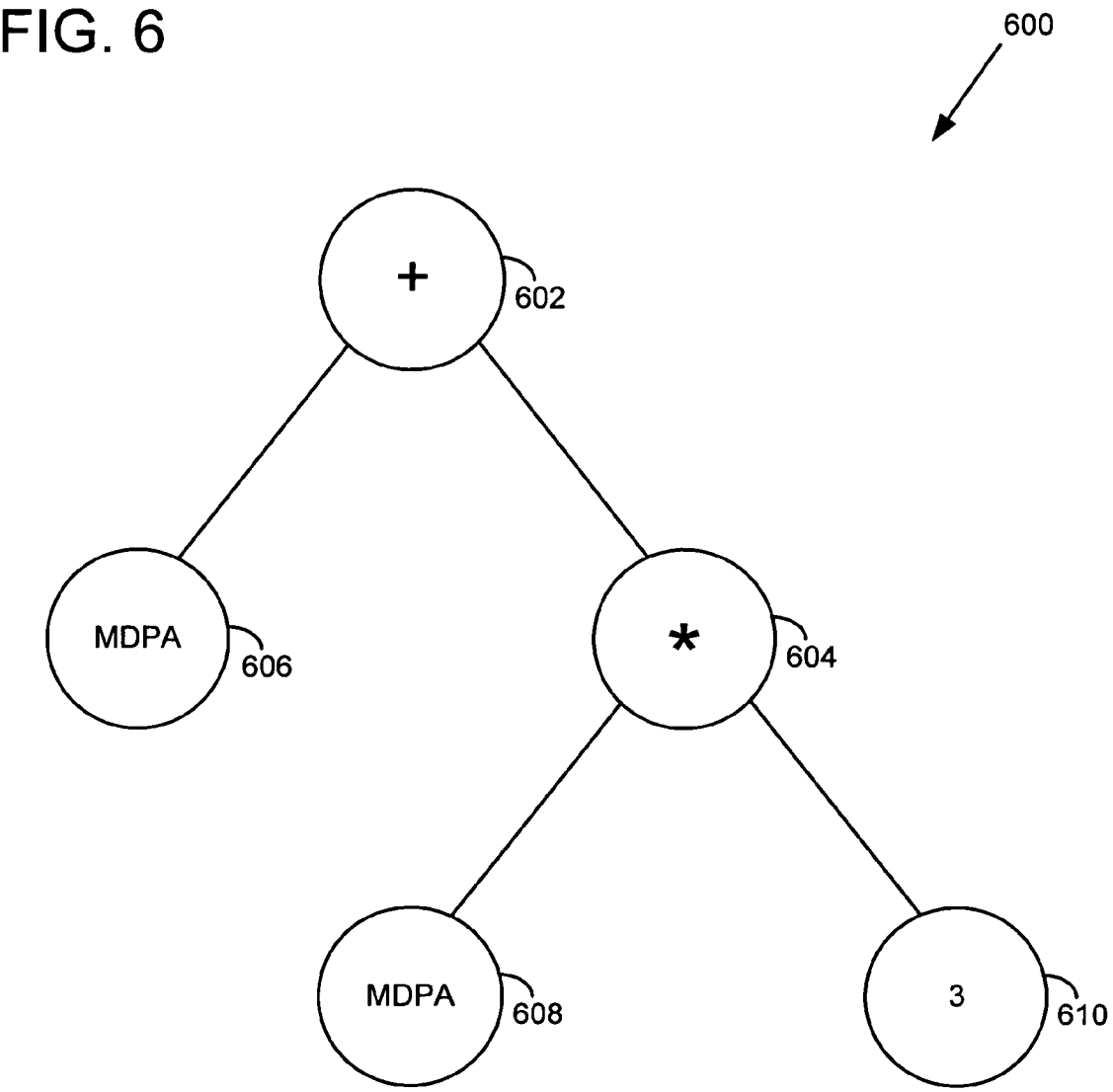
FIG. 6 is a diagram of an exemplary expression comprising a directed acyclic graph.

FIG. 6 is a diagram of an exemplary graph of multi-dimensional data parallel arrays. For example, a directed-acyclic graph (e.g., a DAG) 600 illustrates how MDPAs and related inputs and corresponding operations can be represented in memory.

In this example, a graph comprises operations 602, 604, and operands 606, 608, and 610. In this example, a multi-dimensional data parallel array operand 608 is multiplied 604 by another constant operand 610, and the result is added to another multi-dimensional data parallel array 606. In this example, the nodes of the graph point to the operand values and operators. In one example, leaves of a tree are operands such as MDPAs, constants, etc., and roots of trees are operators. Other models can be used to represent this data for computation.

When a tree is evaluated using the graphics processing unit, the interpreter selects a shader program. For example, an interpreter maps a multiplication operation 604 to a specific graphical program that multiplies 604 a MDPA 608 by a constant 610.

The interpreter then loads the mapped program and input operands into graphical memory, and instructs the GPU to execute the loaded program. The graphical processing unit is efficient because it performs the operation on many elements within the MDPAs in parallel, thereby processing this request much faster than could be performed by the CPU using element by element multiplication.

As the DAGs 600 grow larger, it becomes more critical to manage graphical processing. For example, graphical memory will typically hold a single shader program in memory at any given time—the shader being evaluated. The costs associated with shader programs is compiling them and loading them onto the graphics card. The limited resources are typically the available texture memory, the number of available registers, and the instruction count. Thus, the interpreter builds a shader DAG. Subsequently the shader DAG is partitioned into a series of smaller shaders as required by system constraints. Once these resource considerations are determined, the interpreter evaluates the DAG by loading programs into graphical memory and invoking the GPU.

Exemplary Programming of Graphical Resources

An interpreter builds an expression representing a programmer's requested parallel processing requests, such as MDPAs and their associated inputs and operations. Once the interpreter receives a request for a result, the expression is evaluated by the interpreter and returned.

In one such example, the interpreter is logic embedded in a library component providing MDPA data types and associated operations. In such an example, the interpreter evaluates the expression by making one or more calls on a graphics interface or language such as DirectX®, OpenGL®, Cg®, or HLSL® (i.e., a graphics API (GAPI)).

Because graphics processors have limited resources (e.g., memory, registers, etc.) the interpreter determines and evaluates the DAG without exceeding those resources.

Figure 7:
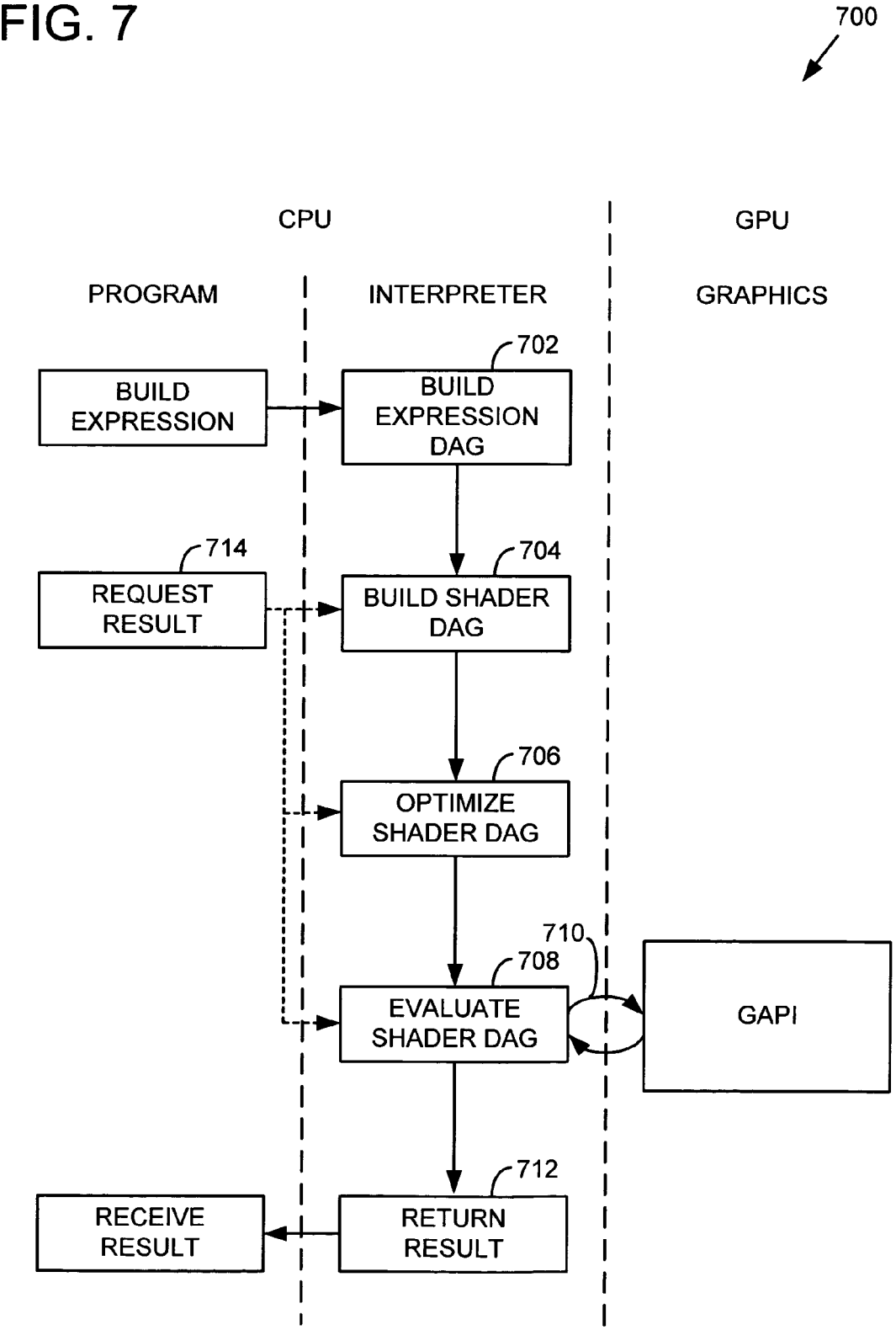
FIG. 7 is a flow chart of an exemplary method providing parallel processing resources to a general purpose high-level programming language.

FIG. 7 is a flow diagram 700 of an exemplary method of providing parallel processing to a general purpose high-level programming language.

At 702, the interpreter builds an expression DAG 702 representing requested parallel processing. For example, referring to FIG. 5, the interpreter receives a request to assign standard language arrays to MDPAs provided via a component library 506. The interpreter assigns the standard arrays to the provided MDPA data types and returns a pointer to the application. As shown in FIG. 5, the application programmer can then use pointer references to define relations 510, 514 on the MDPAs. While the application programmer contemplates these references as relations, the interpreter builds a DAG expression 512, 516. These relations represent the parallel processing operations a programmer desires to be evaluated on the graphics processing unit.

Although not required, as the interpreter builds the expression DAG according to the requested relations, the interpreter can create a shader DAG. Additionally, and optionally, the interpreter may optimize the created shader DAG. In one such example, the interpreter begins creating a DAG of shaders and optimizing that DAG of shaders before a relation result is requested 714 in the standard language 518. Of course, the request 714 may come at anytime 702, 704, 706, 708.

At 704, the interpreter receives a request from the application programming code to evaluate the expression DAG, and the interpreter builds a DAG of shaders. There are two DAGS involved in the evaluation of each expression. There is an expression DAG which directly represents what the user typed. This DAG is converted, at evaluation time, to a shader DAG. The shader DAG is optimized to reduce evaluation overhead.

It is interesting to note a distinction between a node in an expression DAG and a node in a shader DAG. In an expression DAG, a node is simply a user defined operation. In a shader DAG, a node represents a shader program. In one example, each node in the shader DAG, is just-in-time (JIT) compiled into shader assembly language. In one such example, an efficient optimization of the shader DAG is built before evaluation. At 706, the interpreter optimizes the shader DAG, by optimizing the number of shaders used to evaluate the expression. In general, the fewer shaders the better, because running a shader has inherent overhead. This may indicate that a larger shader would often be more efficient. However, although graphics memory has been increasing, there are limits to the number of instructions for shaders. Shaders are typically allowed only a small number of inputs. Some expression nodes can not be combined into one shader, for example, the shift operator makes it too difficult to keep track of the change in location of the input data. Sometimes an expression node must be turned into several shader nodes. For example, an inner product operation is often provided via several shader nodes. Typical reasons for providing several shader nodes for an expression node include the size of the shader or a need for intermediate results.

Additionally, by delaying evaluation until a result is requested in the form of a standard language array, time is available for optimization. For example, by delaying compilation of shader code, a shader DAG is optimized for efficiency. The delay provides the opportunity for optimization of the shader DAG, which often leads to fewer shaders being compiled to evaluate the expression. For example, delayed just-in-time compiling of the shader code provides time to optimize the shader code.

At 708, the interpreter instructs the GPU via the GAPI to evaluate the shader DAGs. The interpreter makes one or more calls on the GAPI instructing it to run shaders with inputs comprising the shader DAGs. In one example, the interpreter, traverses the optimized shader DAG and invokes the graphical resources to evaluate the DAG. For example, the interpreter loads a shader and DAG inputs (e.g., one or more MDPAs, constants, operator, etc.) into graphics memory and instructs the GPU to execute the shader DAG. A shader includes code that runs on the GPU. In one such example, these shader DAGs are built and run by the interpreter via calls on the GAPI.

The interpreter calls the GAPI with the required inputs such as textures (e.g., MDPA), constants register values, etc., and mapped or compiled shaders. A series of calls 710 are made reflecting the traversal of the shader DAG, and once the root of the expression is reached, the interpreter coerces the MDPA back into a standard array and returns 712 the result.

Exemplary Shader Mapping

When providing high-level language constructs (via a component library or otherwise) that can be combined by a programmer in arbitrary ways, an interpreter provides a mapping of high-level requests to graphical programs.

Figure 8:
FIG. 8 is an exemplary data structure for mapping high-level language requests to a graphical processor.

FIG. 8 is an exemplary data structure 800 for mapping high-level language constructs to graphical programs. In one example, a multi-dimensional data parallel array 802 type is associated with a graphics program provided via a graphical programming interface 804. The table associates a MDPA 802 with a preferred shader available from a given one or more 804, 806 shader libraries via a supplied graphics programming interface. In one such example, a table would distinguish between various shader programs based also on the operation requested 808.

Exemplary Optimizations

An expression in the form of data types and operations are received by the interpreter, and the interpreter builds a DAG expression. In order to evaluate the DAG expression, the interpreter converts the DAG expression into a shader DAG.

In order to convert the DAG expression into a shader DAG, a number of considerations must be made. First, the shader DAG should be built in order to generate the minimum number of shaders. Since each node in the shader DAG represents a shader, the number of nodes in the DAG is minimized by combining nodes in the expression DAG. Although, there will be times when a single expression node becomes multiple shader nodes. Additionally, the available graphics resources should be managed in order to provide better efficiency. Finally, the interpreter must implement operations that are not inherent on the graphics and are emulated and/or provided by a collection of shaders.

There are two basic reasons to partition or break a given expression DAG node into two or more shader DAG nodes for evaluation or optimization. One reason is based on the operation requested, when the operation exposed to the user (e.g., AAI) cannot be implemented by any one shader. For example, the number of instructions required for an operation can be too large to fit into memory at once. For example, in order to perform an inner product operation, many shaders are needed. This is because the interpreter cannot write to any temporary memory in the shader.

In one such example, there is a series of inputs such as textures, registers, and constant values, and the shader produces another texture as an output. A new node in the DAG is required when a next operation in the DAG requires an output texture as an input to the next shader operation. In a general sense, a texture is analogous to an array, and pixels within textures are analogous to elements of an array. Thus, the GPU is processing an operation on many (possibly all) of the pixels (elements) within the texture (array) simultaneously. Thus, a particular shader may combine (e.g., add, multiply, etc.) parts of several input textures to create an output. When another shader requires this output as input, a break in the DAG is often necessary. A break in a shader DAG corresponds with providing a new shader to the GPU.

In graphics applications, to specify which pixels to utilize as inputs to an operation, triangles are combined to cover those pixels within a texture. Thus, triangles are used to control source values, and those triangles can be viewed as a transform map from a source texture to an output texture. Since we are computing on arrays, they are represented by two triangles forming a rectangle whose shape exactly matches that of the array.

Figure 9:
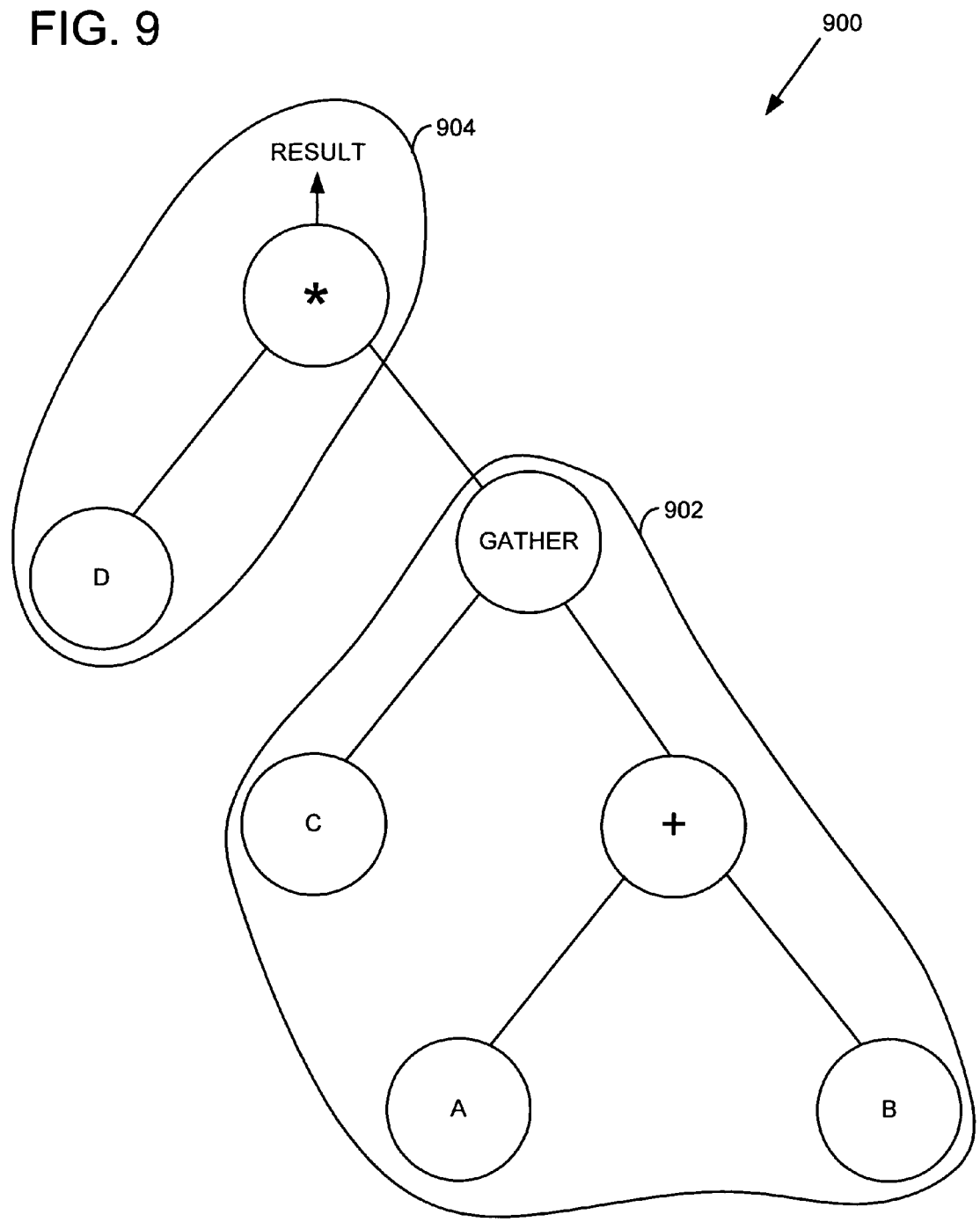
FIG. 9 is an exemplary graph illustrating a shader program break.

FIG. 9 is a graph 900 diagram used to illustrate when to break an expression graph into two shader programs (nodes). In this example, a single shader is used to add A and B, and another is used to perform a gather operation. It is necessary to separate the gather since the shape of the input and output textures are different because so the coordinates where source pixels are taken from is severely altered for the multiplication. Thus, this example requires two shaders 902, 904.

There are many reasons for converting the expression DAG into a shader dag with many nodes. For example, the interpreter can check to see whether or not the maximum number of instructions for a single shader are exceeded, the maximum number of textures are exceeded, the maximum number of look-ups are exceeded, and many other resource constraints.

In one example, the interpreter performs a depth first traversal of the expression DAG and sums the relevant resources. As the evaluation begins to exceed maximum graphics resources, a new shader node is created.

For example, in FIG. 9, the plus will receive a number of instructions and graphical resources, and so will the gather. So even if gather could be combined with the multiplication, a resource constraint could have caused a new shader node in the shader DAG 900. If a next operation would have caused you to run out of resources for textures, instructions, or any number of other resources, a break, or new shader node is created at that point.

In another example, an interpreter maintains a cache of recently compiled shaders. Thus, a cache or a list of recently compiled shaders can be used to save compiling time when there is a potential for a shader to be used again soon. In one such example, the shader code is kept in a cache, and when the shader DAG tree is traversed, the interpreter checks to see if an already compiled shader can be re-used.

The actual process of compiling a shader is not trivial. It requires a call on the GAPI (e.g., DirectX®), and will require thousands of cycles in some cases, and cached shaders allow saving compilation time.

One of the goals is to create shaders that are as large as possible, so more of the DAG expression can be performed without requiring a break to reload a new shader into graphical memory. By reusing resources still in graphical memory, fewer temporary intermediate results need to be created. There is a cost associated with a break because whenever there is a break, there is a context switch back to the CPU to set up the inputs for the next shader. Another optimization that is performed is resource allocation. The shader code is generated so that the fewest number of temporary registers and other resources are used.

Exemplary Computing Environment

Figure 10:
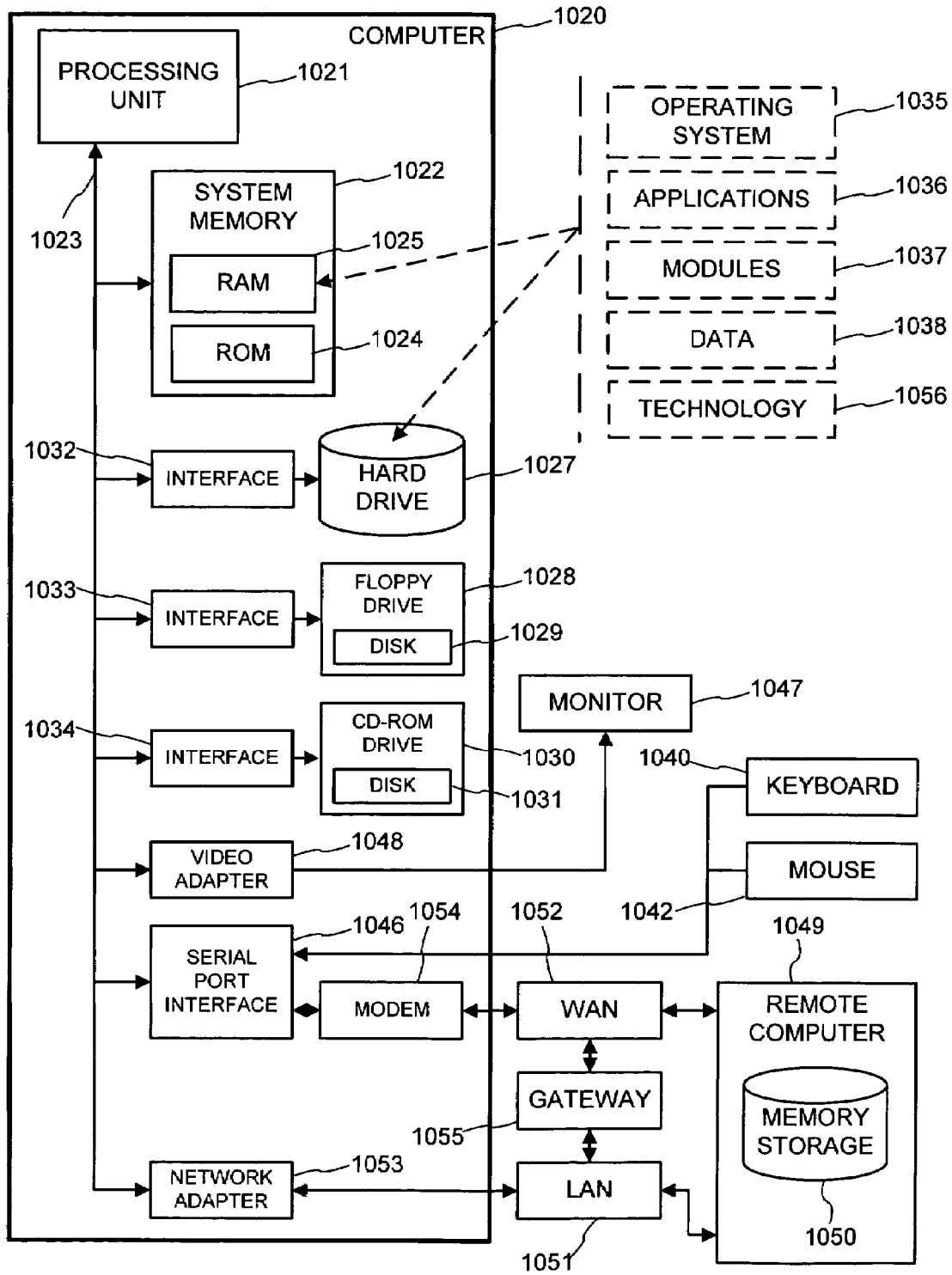
FIG. 10 is a block diagram of a distributed computer system implementing the described technologies.

FIG. 10 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that performs particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 10, an exemplary system for implementation includes a conventional computer 1020 (such as personal computers, laptops, servers, mainframes, and other variety computers) includes a processing unit 1021, a system memory 1022, and a system bus 1023 that couples various system components including the system memory to the processing unit 1021. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 1021.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 1024 and random access memory (RAM) 1025. A basic input/output system (BIOS), containing the basic routines that help to transfer information between elements within the computer 1020, such as during start-up, is stored in ROM 1024.

The computer 1020 further includes a hard disk drive 1027, a magnetic disk drive 1028, e.g., to read from or write to a removable disk 1029, and an optical disk drive 1030, e.g., for reading a CD-ROM disk 1031 or to read from or write to other optical media. The hard disk drive 1027, magnetic disk drive 1028, and optical disk drive 1030 are connected to the system bus 1023 by a hard disk drive interface 1032, a magnetic disk drive interface 1033, and an optical drive interface 1034, respectively. The drives and their associated computer-readable media provide nonvolatile storage of data, data structures, computer-executable instructions, etc. for the computer 1020. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 1025, including an operating system 1035, one or more application programs 1036, other program modules 1037, and program data 1038; in addition to an implementation of the described methods and systems of providing graphics resources through high level language constructs 1056.

A user may enter commands and information into the computer 1020 through a keyboard 1040 and pointing device, such as a mouse 1042. These and other input devices are often connected to the processing unit 1021 through a serial port interface 1046 that is coupled to the system bus, but may be connected by other interfaces, such as a parallel port, game port or a universal serial bus (USB). A monitor 1047 or other type of display device is also connected to the system bus 1023 via an interface, such as a video adapter 1048. In addition to the monitor, computers typically include other peripheral output devices (not shown), such as speakers and printers.

The computer 1020 operates in a networked environment using logical connections to one or more remote computers, such as a remote computer 1049. The remote computer 1049 may be a server, a router, a peer device or other common network node, and typically includes many or all of the elements described relative to the computer 1020, although only a memory storage device 1050 has been illustrated. The logical connections depicted include a local area network (LAN) 1051 and a wide area network (WAN) 1052. Such networking environments are commonplace in offices, enterprise-wide computer networks, intranets and the Internet.

When used in a LAN networking environment, the computer 1020 is connected to the local network 1051 through a network interface or adapter 1053. When used in a WAN networking environment, the computer 1020 typically includes a modem 1054 or other means for establishing communications (e.g., via the LAN 1051 and a gateway or proxy server 1055) over the wide area network 1052, such as the Internet. The modem 1054, which may be internal or external, is connected to the system bus 1023 via the serial port interface 1046. In a networked environment, program modules depicted relative to the computer 1020, or portions thereof, may be stored in the remote memory storage device. It will be appreciated that the network connections shown are exemplary and other means of establishing a communications link between the computing devices may be used, wireless or otherwise.

ALTERNATIVES

Having described and illustrated the principles of our invention with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of our invention may be applied, it should be recognized that the details are illustrative only and should not be taken as limiting the scope of our invention. Rather, we claim as our invention all such embodiments as may come within the scope and spirit of the following claims and equivalents thereto.

We claim:

1. A computerized method comprising:

providing a library to applications programmers comprising at least one abstract datatype representing parallel arrays with at least one dimension and parallel operations associated with the parallel arrays, wherein the applications programmers assign standard language arrays to the parallel arrays because the parallel operations cause a graphic processing unit to operate on the elements of the parallel arrays in parallel;

in response to receiving at least one call to a parallel operation provided by the library, building a graph data structure representation of the parallel operation and returning a pointer to the graph data structure representation wherein a node of the graph data structure representation comprises a standard array resident in a memory associated with a central-processing unit;

in response to receiving at least one call to a parallel operation provided by the library wherein the call's arguments include the pointer to the graph data structure representation, building a larger graph data structure representation of the parallel operation wherein a first node of the larger graph data structure representation comprises the standard array resident in the memory associated with of the central-processing unit and a second node of the larger graph data structure representation comprises a parallel operation associated with at least one of the parallel arrays;

in response to receiving at least one call requiring evaluation of the parallel operation represented by the larger graph data structure representation, evaluating the parallel operation represented by the larger graph data structure representation, the evaluation comprising, traversing the larger graph data structure representation and constructing a shader graph comprising plural pixel shader programs, traversing the shader graph and invoking at least one operation via the graphic-processing unit to evaluate each pixel shader program, wherein the standard array is copied to a memory associated with the graphic-processing unit as input to at least one of the pixel shader programs, and copying an output of at least one pixel shader program from the memory associated with the graphic-processing unit to the memory associated with the central-processing unit;

returning the output comprising a standard array resident in the memory of the central-processing unit.

2. The method of claim 1, wherein the larger graph data structure representation is a directed graph.

3. The method of claim 1, wherein at least one node of the larger graph data structure representation comprises an operator from a set of operators, wherein the set of operators comprises at least a multiplication operator, and wherein directed edges of the graph data structure from that node represent operands for the operator.

4. The method of claim 3, wherein at least one node of the larger graph data structure comprises an array with at least two dimensions.

5. The method of claim 1, wherein an operation to evaluate a pixel shader program on the graphic-processor unit comprises compiling a pixel shader and invoking the compiled pixel shader.

6. The method of claim 1, wherein evaluating the parallel operation is delayed until the at least one call requiring evaluation.

7. The method of claim 1, wherein the shader graph is constructed before the at least one call requiring evaluation.

8. The method of claim 7, wherein the shader graph is traversed and invoked upon the at least one call requiring evaluation.

9. The method of claim 1, wherein the output is copied to the memory associated with the central processing unit after the returning the output comprising a standard array resident in the memory associated with the central-processing unit.

10. The method of claim 1, wherein an operation to evaluate a pixel shader on the graphic-processor unit comprises identifying a recently compiled pixel shader in a shader cache and invoking the identified pixel shader.

11. The method of claim 1, wherein an operation to evaluate a pixel shader further comprises determining whether a present pixel shader has resources to perform a next operation in the graph.

12. The method of claim 11, wherein the present pixel shader is determined to have resources to perform a next operation, and the method invokes the next operation on the present pixel shader.

13. The method of claim 11, wherein the present pixel shader is determined not to have resources to perform a next operation and the method compiles a new shader program to perform the next operation.

14. A computer system comprising:

a graphics card comprising graphics memory and a graphics processing unit;

computer memory and a central processing unit coupled to the graphics card;

an application program requesting parallel processing via a library component;

the library component providing to the application program at least, abstract data types having parallel arrays and associated parallel operations, and an interpreter for receiving parallel processing requests from the application program and performing a method comprising:

receiving a first parallel operation request, building a graph data structure representation of the parallel operation and returning a pointer to the graph data structure representation wherein a node of the graph data structure representation comprises a standard array resident in the computer memory;

receiving a second parallel operation request wherein the request's arguments include the pointer to the graph data structure representation, and building a larger graph data structure representation of the second parallel operation, wherein a node of the larger graph data structure representation comprises the standard array resident in the computer memory;

responsive to receiving a request requiring evaluation of the second parallel operation represented by the larger graph data structure representation, evaluating the second parallel operation represented by the larger graph data structure representation, the evaluation comprising, traversing the larger graph data structure representation and constructing a shader graph comprising plural pixel shader programs, traversing the shader graph and invoking at least one operation to evaluate each pixel shader program on a graphic-processor unit, wherein the standard array is copied to graphics memory as input to at least one of the pixel shader programs, and copying an output of at least one pixel shader program from graphics memory to the computer memory;

returning the output comprising a standard array resident in the computer memory.

15. The computer system of claim 14, wherein the interpreter is a just-in-time compiler.

16. The computer system of claim 14, wherein evaluating the second parallel operation begins before the request requiring evaluation.

17. The computer system of claim 14, wherein constructing a shader graph begins before the request requiring evaluation is received.

18. The computer system of claim 14, wherein traversing the shader graph begins before the request requiring evaluation is received.

19. A computer-readable storage medium having stored thereon computer-executable instructions comprising:

instructions providing a library to applications programmers comprising at least one abstract datatype representing parallel arrays with at least one dimension and parallel operations associated with the parallel arrays, wherein the applications programmers assign standard language arrays to the parallel arrays because the parallel operations cause the a graphic-processing unit to operate on the elements of the parallel arrays in parallel;

instructions for responsive to receiving at least one call to a parallel operation provided by the library, building a graph data structure representation of the parallel operation and returning a pointer to the graph data structure representation wherein a node of the graph data structure representation comprises a standard array resident in a memory associated with a central-processing unit;

instructions for responsive to receiving at least one call to a parallel operation provided by the library wherein the call's arguments include the pointer to the graph data structure representation, building a larger graph data structure representation of the parallel operation wherein a node of the larger graph data structure representation comprises the standard array resident in the memory associated with the central-processing unit;

instructions for evaluating the parallel operation represented by the larger graph data structure representation, the evaluation comprising, traversing the larger graph data structure representation and constructing a shader graph comprising plural pixel shader programs, traversing the shader graph and invoking at least one operation to evaluate each pixel shader program on the graphic-processing unit, and wherein the standard array is copied to a memory associated with the graphic-processing unit as input to at least one of the pixel shader programs, and copying an output of at least one pixel shader program from the memory associated with the graphic-processing unit to the memory associated with the central-processing unit;

instructions for responsive to receiving at least one call requiring evaluation of the parallel operation represented by the larger graph data structure representation, performing the evaluation and returning the output comprising a standard array resident in the memory of a central-processing unit.

20. The computer-readable medium of claim 19, wherein nodes of the larger graph data structure representation comprise operators and operands, and operators comprise at least an addition operator.

21. The computer-readable medium of claim 19, wherein constructing a shader graph comprises identifying a recently compiled shader in a shader cache.

22. The computer-readable medium of claim 19, wherein invoking at least one operation to evaluate each pixel shader program on the graphic-processor unit comprises determining whether a pixel shader program presently stored in the memory associated with the graphic-processor unit performs a next parallel operation required in the shader graph.

23. A computer system comprising:

a graphics card comprising graphics memory and a graphics processing unit;

computer memory and a central processing unit coupled to the graphics card;

an application program requesting parallel processing via a library component;

the library component providing to the application program at least, abstract data types having parallel arrays and associated parallel operations, and an interpreter for receiving parallel processing requests from the application program and performing a method comprising:

receiving a first parallel operation request, building a directed acyclical graph data structure representation of the parallel operation and returning a pointer to the directed acyclical graph data structure representation, wherein a first node of the directed acyclical graph data structure representation comprises a standard array with at least two dimensions resident in the computer memory;

receiving a second parallel operation request, wherein the request's arguments include the pointer to the directed acyclical graph data structure representation, and building a larger directed acyclical graph data structure representation of the second parallel operation, wherein a second node of the larger directed acyclical graph data structure representation comprises a standard array resident in the computer memory, the second node of the larger directed acyclical graph comprising a multiplication operator, and at least one edge of the larger directed acyclical graph represents operands for the multiplication operator;

responsive to receiving a request requiring evaluation of the second parallel operation represented by the larger directed acyclical graph data structure representation, evaluating the second parallel operation represented by the larger directed acyclical graph data structure representation, the evaluation comprising:

traversing the larger directed acyclical graph data structure representation and constructing a shader graph comprising plural pixel shader programs, traversing the shader graph and invoking at least one operation to evaluate each pixel shader program on a graphic-processor unit, wherein the standard array is copied to graphics memory as input to at least one of the pixel shader programs and the at least one operation comprises identifying a recently compiled pixel shader in a shader cache and invoking the identified pixel shader program, and copying an output of the identified pixel shader program from graphics memory to the computer memory;

responsive to receiving a request requiring evaluation of the second parallel operation represented by the larger graph representation, returning the output comprising a standard array with at least two dimensions resident in the computer memory.

* * * * *

UNITED STATES PATENT AND TRADEMARK OFFICE
CERTIFICATE OF CORRECTION

PATENT NO. : 7,598,953 B2
APPLICATION NO. : 10/982027
DATED : October 6, 2009
INVENTOR(S) : Tarditi, Jr. et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1200 days.

Signed and Sealed this

Twenty-eighth Day of September, 2010

David J. Kappos
*Director of the United States Patent and Trademark Office*